US008196127B2

(12) United States Patent
Gschwind

(10) Patent No.: US 8,196,127 B2
(45) Date of Patent: *Jun. 5, 2012

(54) PERVASIVELY DATA PARALLEL INFORMATION HANDLING SYSTEM AND METHODOLOGY FOR GENERATING DATA PARALLEL SELECT OPERATIONS

(75) Inventor: Michael Karl Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1582 days.

This patent is subject to a terminal disclaimer.

(21) Appl. No.: 11/462,472

(22) Filed: Aug. 4, 2006

(65) Prior Publication Data

US 2008/0034356 A1 Feb. 7, 2008

(51) Int. Cl.
*G06F 9/45* (2006.01)
(52) U.S. Cl. .................. 717/154; 717/151; 717/152
(58) Field of Classification Search .................. None
See application file for complete search history.

(56) References Cited

U.S. PATENT DOCUMENTS

| | | | | |
|---|---|---|---|---|
| 4,710,872 | A * | 12/1987 | Scarborough | 717/160 |
| 5,274,818 | A * | 12/1993 | Vasilevsky et al. | 717/149 |
| 5,999,736 | A * | 12/1999 | Gupta et al. | 717/158 |
| 6,088,511 | A * | 7/2000 | Hardwick | 717/149 |
| 6,959,378 | B2 | 10/2005 | Nickolls et al. | |
| 2004/0003381 | A1 * | 1/2004 | Suzuki et al. | 717/150 |
| 2004/0060040 | A1 * | 3/2004 | Collard | 717/151 |
| 2005/0071828 | A1 | 3/2005 | Brokenshire et al. | |
| 2005/0097301 | A1 * | 5/2005 | Ben-David et al. | 712/22 |
| 2005/0273770 | A1 * | 12/2005 | Eichenberger et al. | 717/136 |
| 2005/0283769 | A1 | 12/2005 | Eichenberger et al. | |
| 2005/0283773 | A1 | 12/2005 | Eichenberger et al. | |
| 2007/0079302 | A1 * | 4/2007 | Muthukumar et al. | 717/151 |
| 2007/0124722 | A1 * | 5/2007 | Gschwind | 717/106 |
| 2008/0034357 | A1 * | 2/2008 | Gschwind | 717/149 |

OTHER PUBLICATIONS

W. Chuang, B. Calder, J. Ferrante "Phi-Predication for Light-Weight If-Conversion", 2003, In Proceedings of the International Symposium on Code Generation and Optimization, pp. 179-190.*
S. Mahlke, D. Lin, W. Chen, R. Hank, R. Bringmann "Effective Compiler Support for Predicated Execution Using the Hyperblock", 1992, Proc. of the 25th International Symposium on Microarchitecture, pp. 45-54.*
J. Shin, M. Hall, J. Chame "Superword-level parallelism in the presence of control flow", 2005, International Symposium on Code Generation and Optimization. pp. 165-175.*
BIK 1 "Automatic Intra-Register Vectorization", IJPP, vol. 30, No. 2 (Apr. 2002).
BIK 2 "Vectorization with the Intel Compilers" (downloaded from www.intel.com on Apr. 28, 2006).
Eichenberger 1 "Optimizing Compiler for the Cell Proc-Slides" (Sep. 20, 2005).

(Continued)

*Primary Examiner* — Jason Mitchell
(74) *Attorney, Agent, or Firm* — Matt Talpis; Mark P Kahler

(57) ABSTRACT

An information handling system (IHS) employs a compiler methodology that seeks to improve the efficiency of code that executes in a multi-core processor. The compiler receives source code and converts the source code for execution using data parallel select operations that perform well in a single instruction multiple data (SIMD) environment. The compiler of the IHS may apply one or several optimization processes to the code to increase execution efficiency in a parallel processing environment.

8 Claims, 19 Drawing Sheets

OTHER PUBLICATIONS

Eichenberger 2 "Optimizing Compiler for a Cell Processor IEEE-PACT" (Sep. 2005).
Eichenberger 3 "Vectorization for SIMD with Alignment Constraints" ACM (2004).
Gschwind "Synergistic Processing in Cell's Multicore Architecture" IEEE CS (Mar. 2006).
IBM "Cell Broadband Engine Architecture", pp. 1-319, (Aug. 8, 2005).
Kahle "Introduction to the Cell Multiprocessor" IBM JRD Jul. 2005.
Larsen "Exploiting Superword Level Parallelism with Multimedia Instruction Sets", MIT (Nov. 1999).
Mahlke1 "A Comparison of Full & Partial Predicated Exec. Support for ILP Processors", ISCA (1995).
Mahlke2 "Characterizing the Impact of Predication Execution . . . ", Proc. 27th ISM (Nov. 1994).
Page—IBM's Cell Processor, (May 15, 2005).
SIMD "Wikipedia", (downloaded from www.wikipedia.org on Mar. 2006).
Vector "Wikipedia", (downloaded from www.wikipedia.org on Mar. 2006).
Wu "An Integrated Simdization Framework Using Virtual Vectors", ACM (Jun. 2005).

* cited by examiner

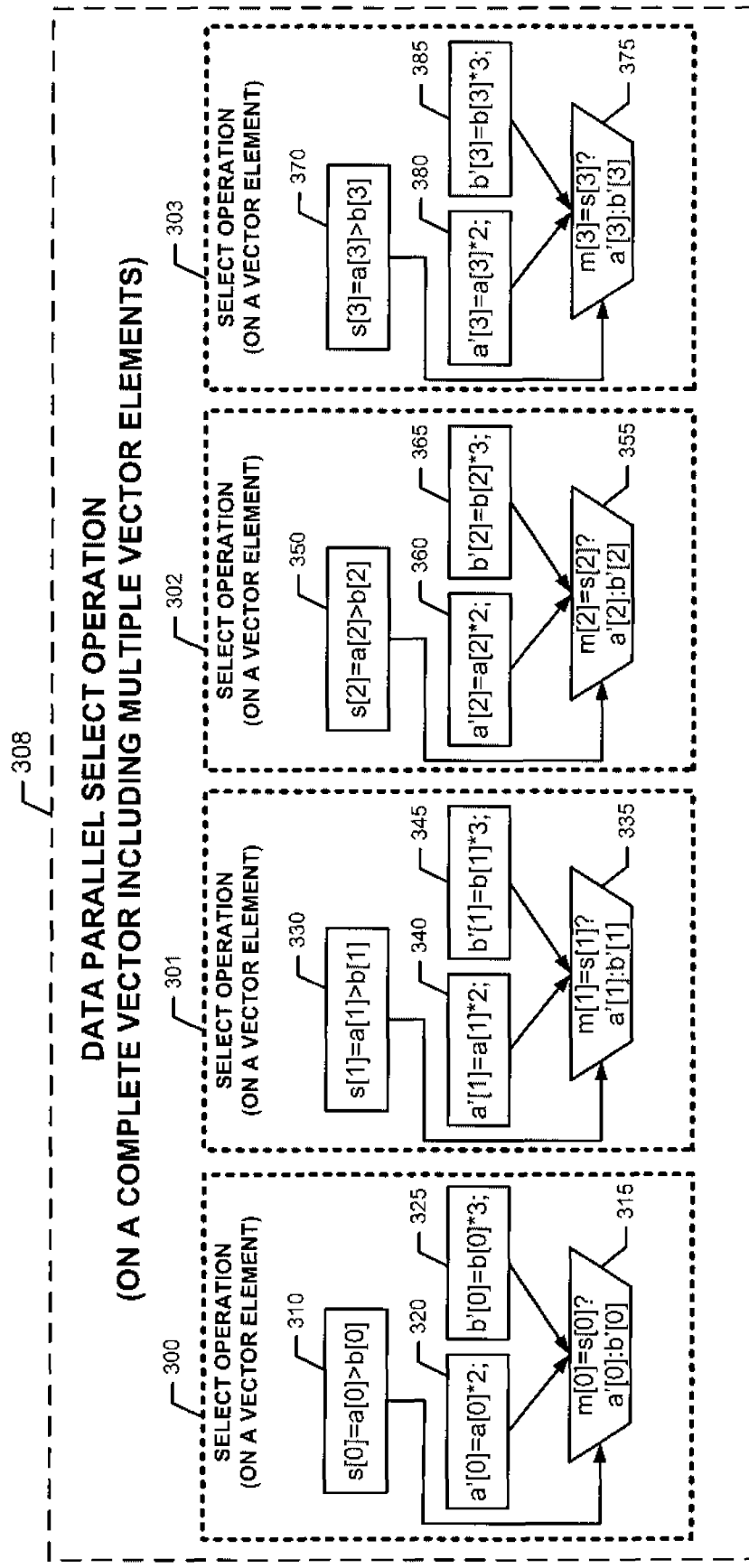

FIG. 11A
HYPERBLOCKING
FIG. 11B
PHI-NODE CONVERSION
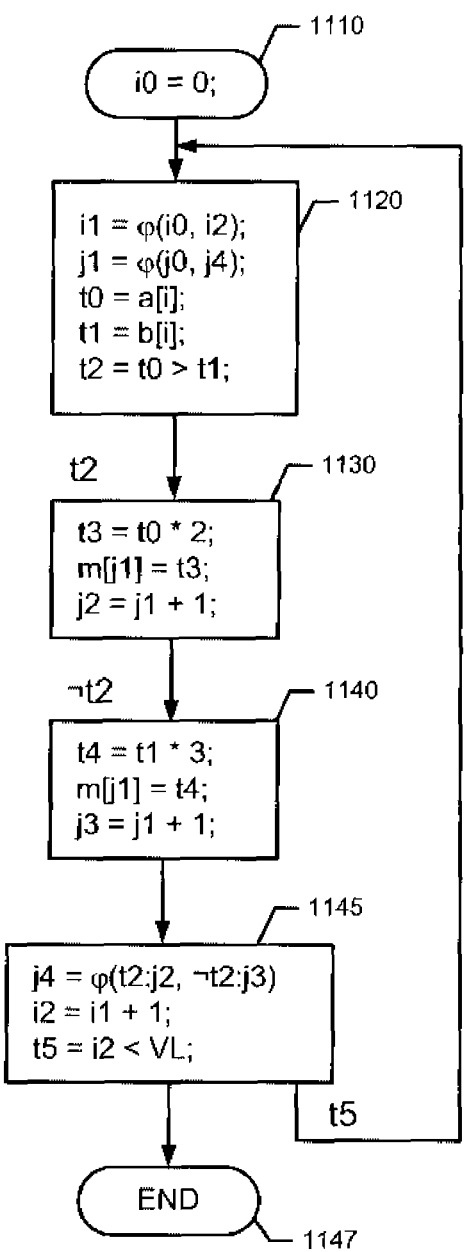
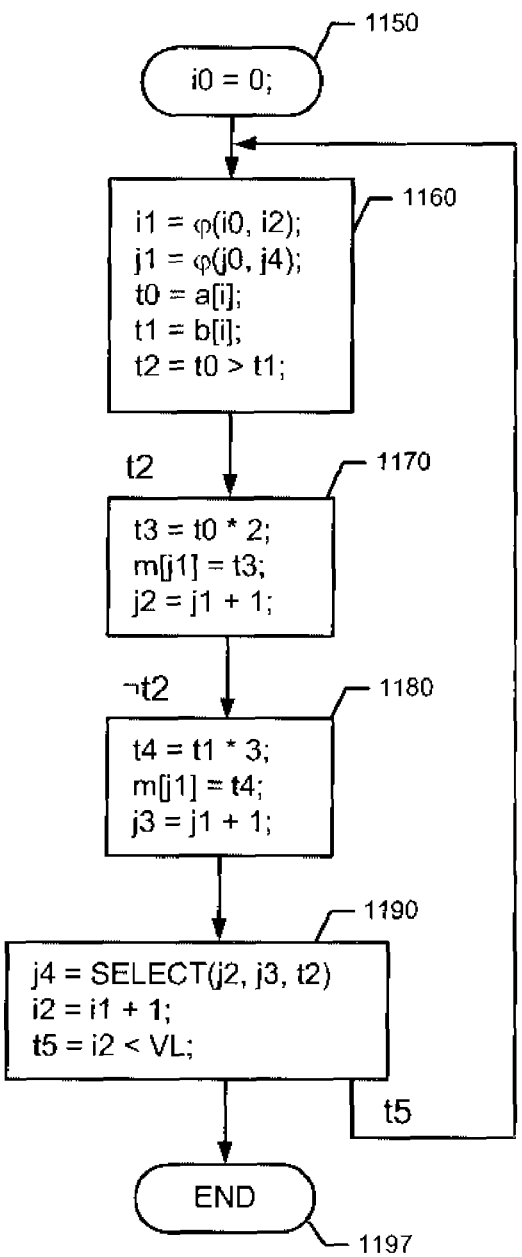

CONDITIONAL STORE CONVERSION

MERGING HYPERBLOCKS INTO A SINGLE BLOCK

SELECT COMBINING

SELECT PROMOTION

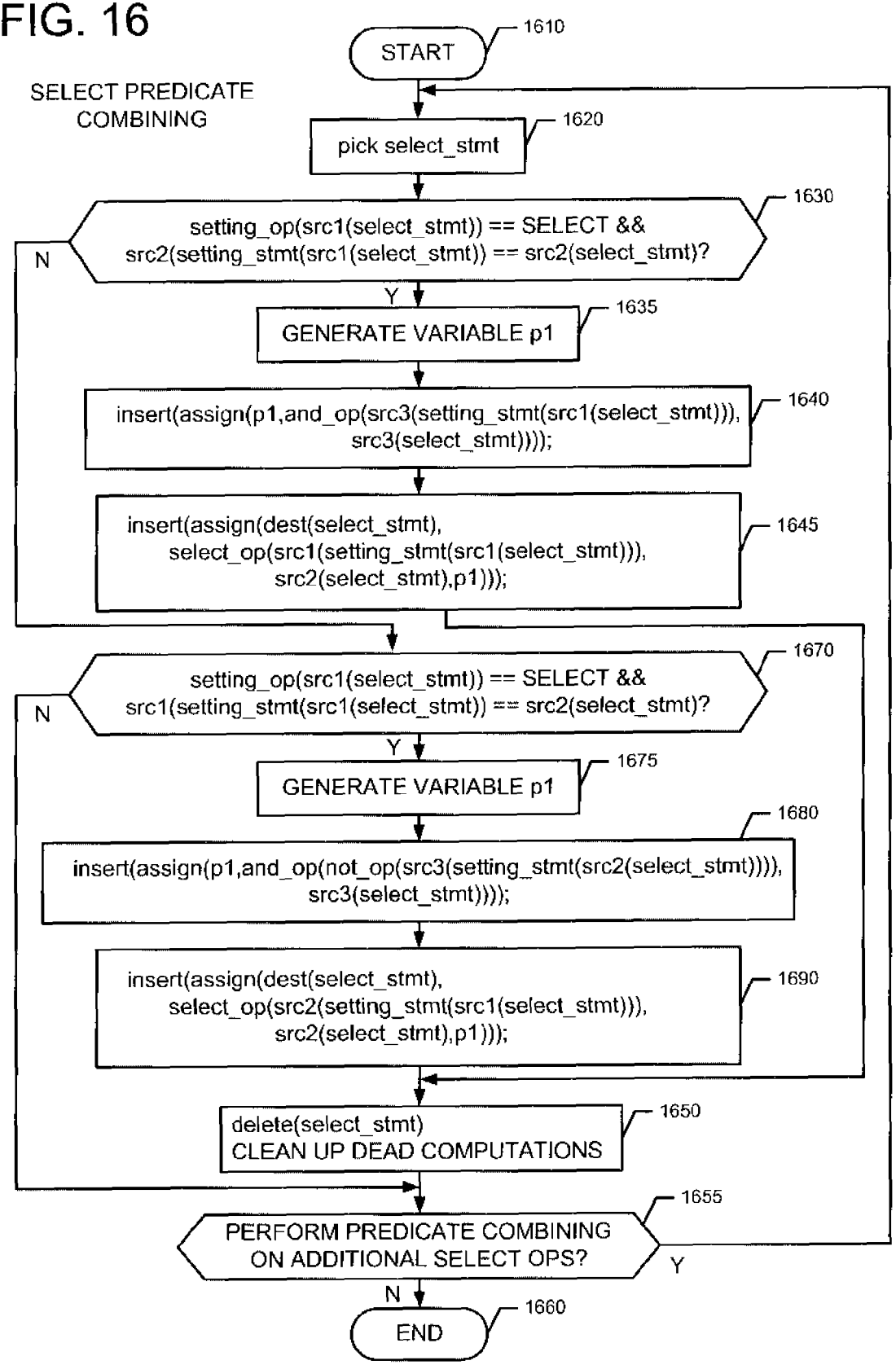

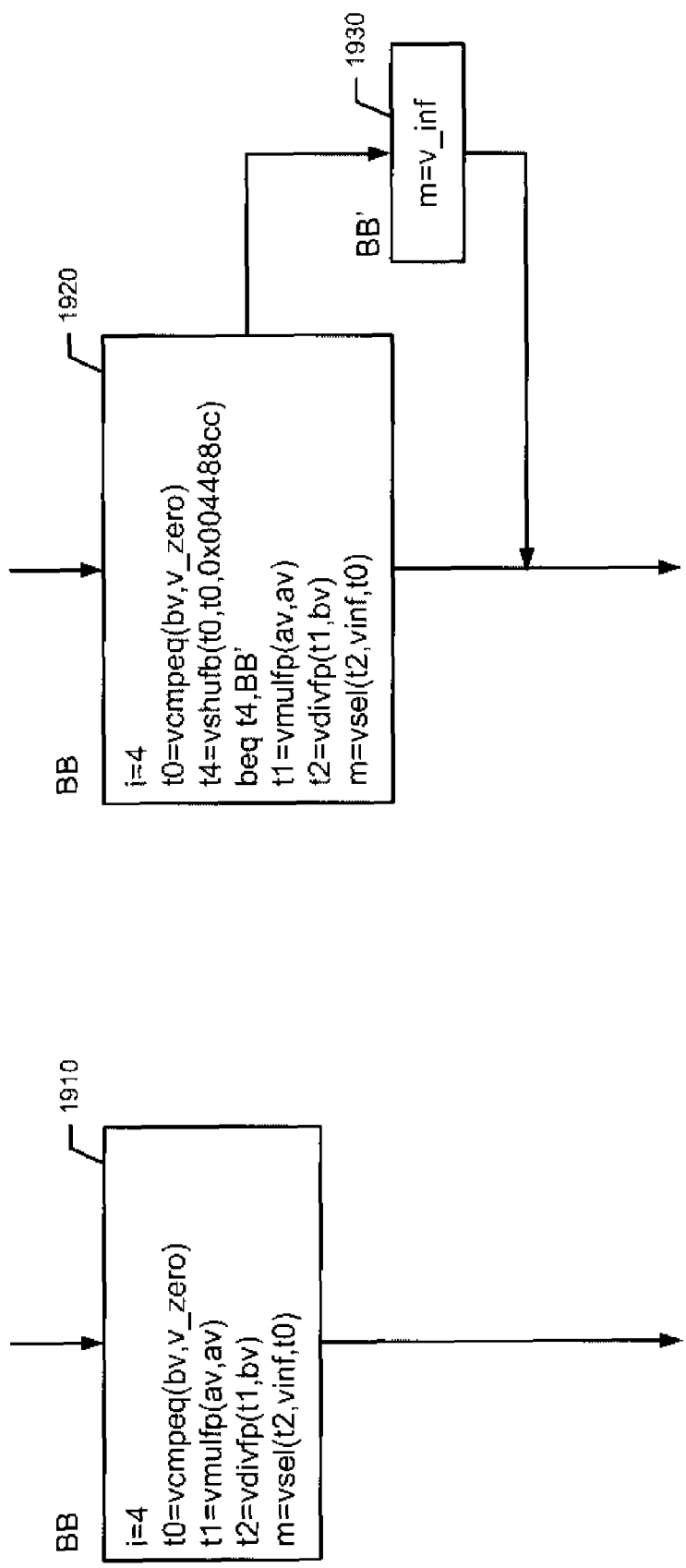

PERVASIVELY DATA PARALLEL INFORMATION HANDLING SYSTEM AND METHODOLOGY FOR GENERATING DATA PARALLEL SELECT OPERATIONS

CROSS REFERENCE TO RELATED PATENT APPLICATIONS

This patent application relates to the U.S. patent application entitled "Method And Apparatus For Generating Data Parallel Select Operations In A Pervasively Data Parallel System", inventor Gschwind, Ser. No. 11/462,485, filed concurrently herewith and assigned to the same assignee), the disclosure of which is incorporated herein by reference in its entirety.

TECHNICAL FIELD OF THE INVENTION

The disclosures herein relate generally to parallel processor systems, and more particularly, to parallel processor systems that employ data parallel select operations.

BACKGROUND

Software "test and branch" instruction execution is a fundamental aspect of compiling architectures that modern information handling system (IHS) architectures employ. In conventional software code instruction sequences, execution of a conditional branch instruction results in a branch to one of multiple code paths dependent on the analysis of a specified conditional event. Moreover, the processor that executes the code sequence must typically determine the conditional event prior to the execution of the branch sequence. A simplified example of conditional branching is the decision branch. In the typical decision branch, process flow stops at point in a program and the processor makes a decision which way to proceed among multiple code branches dependent on a test result. An "if-else" statement is a common example of such a decision branch Once the processor takes the proper branch based on the test result, flow resumes and the processor continues executing the instructions in the now selected branch.

The pseudocode in TABLE 1 below represents a conventional conditional test and branch sequence. Pseudocode is not a direct input to a processing system, but rather is a language that programmers and non-programmers often use to first develop a more readable version of program code under development. Typically, an agent interprets or transforms pseudocode into the proper syntax of a machine dependent computer language before the processor executes the code.

TABLE 1 if condition
   do this
else
   do that

Before branch sequences execute conditionally, the code may translate to machine language instructions such as seen in TABLE 2 below.

TABLE 2 branch if condition to label 1
   do that
   branch to label 2
label 1:
   do this
label 2:
   processing continues with code following if-else statement As seen in TABLE 2, the machine level code is more complex than the original branching pseudocode. When a software program must first evaluate a condition prior to continuing, this may result in significant data flow delays. Such delays are particularly evident in a scalar processing environment while working directly on discrete terms. Scalar operations operate on integers and real argument types, but not directly on vectors or arrays. A vector is a one dimensional array of variables or data. Other techniques, such as predictive methodologies, can reduce some aspects of branching inefficiencies. However, prediction methods exhibit their own inherent efficiencies related to misprediction and poor data event scheduling. Moreover, in pipelined systems, look-ahead operations may disrupt program flow when misprediction events occur.

Conventional processor systems may employ branch predication to manage branch sequences in program code. Branch predication provides a methodology of conditionally branching program code based on a predefined predicate. Predicate logic replaces conditional test and branch sequences with predicated sequences. Predicated branch sequence execution provides an increase in efficiency when the program code uses short branch lengths. In a pipelined system, the processor may execute both branch paths in advance of executing a conditional branch. As the processor catches up and determines which path is accurate, the processor may discard one path by using predication methodologies or specialized look-ahead processing. Using the previous pseudocode example, the simple branch sequence now converts to the predicated example in TABLE 3 which illustrates branch predication.

TABLE 3

(condition) do this
(not condition) do that

The elimination of the specific branches by such branch predication desirably results in less code. However, if the "do this" and "do that" blocks of code are long themselves, i.e. correspond to long code paths, then this branch predication technique may also become inefficient. Branch predication is combinable with branch prediction techniques wherein register information helps predict the most likely branch path. Branch prediction methodologies can be complex. Moreover, branch prediction is prone to misprediction events which result in large resource inefficiencies and re-processing overhead. Additionally, sequences that predicated execution generates are not properly vectorizable for use in a SIMD (single instruction multiple data) environment. In an object oriented environment, the environment defines vectors as a single object. Each vector associates with functions that can operate specific to that object or vector. Because branch-based sequences are inherently scalar in nature, eliminating branch sequences may allow conversion of the code to a vector-based code. Such a vector-based code is more easily convertible to SIMD instruction-based sequences.

SIMD-based code is readily usable in multi-core processor systems such as those that include synergistic processor units (SPUs). Multi-core processor systems provide an excellent environment for parallel processing of complex software code. Moreover, multi-core systems also provide an environment for managing vectors more efficiently. However, even a parallel SIMD environment first converts vectors to scalar data when using conditional test and branch sequences. The SIMD environment unpacks the vectors, operates on the unpacked vectors, and then repacks the vectors before flow continues. In another limitation of the conventional SIMD environment, the environment may not easily adapt predicated sequences to data parallel operations. Predication inhibits the architectural execution of an entire instruction in a data parallel environment. Thus, predicated code is not easily vectorizable for use in a data parallel system.

In yet another aspect of managing branch sequences in conventional processor systems, a processor system may employ data parallel select execution methodology. Data parallel select execution provides for two data inputs and a select control input. A register file stores the data associated with the 2 data inputs and the control input. Data parallel select execution independently selects one of the two data inputs for each vector slot under the control of the select control input. The select control input effectively acts as input for the selection of the proper coded sequence. Using data parallel select methodology to compute the result of conditional program flow integrates conditional operation into SIMD-based computation by eliminating the need to convert between scalar and vector representation. The resulting vectorized code thus contains conditional expressions, which in turn lets a processor core or SPU execute conditional execution sequences in parallel.

In summary, conditional branch sequences are not well suited for pipelined or data parallel processor systems. Conditional branches often cause data misprediction events and disruption of pipelined flow. Predicated executions are limited to processor systems exhibiting full predication capability. Moreover, predicated executions exhibit the limitation that they require scalar processing. In addition, predicated executions are inherently inefficient when the processor encounters long branch execution paths.

What is needed is a method of translating conditional test and branch operations into data parallel select operations that addresses the problems above.

SUMMARY

Accordingly, in one embodiment, an information handling system (IHS) is disclosed that includes a processor capable of processing program code that includes data parallel select processing operations. The IHS includes a memory coupled to the processor, wherein the memory includes a compiler. The compiler receives an instruction stream including a plurality of instructions that form the program code. The instructions of the instruction stream are related to both scalar and vector data. The compiler injects data parallel select instructions into the instruction stream to form a modified instruction stream wherein conditional test and branch instructions are replaced with data parallel select instructions. The compiler revises the modified instruction stream to enhance execution of the data parallel select instructions, thus providing a revised modified instruction stream. The compiler generates vectorized code from the revised modified instruction stream.

In another embodiment, an information handling system (IHS) is disclosed that includes a multi-core processor capable of processing source code that includes data parallel select processing operations. In one embodiment, the processor is a heterogeneous processor including a plurality of cores. The IHS includes a storage apparatus that is coupled to the processor. The storage apparatus stores a compiler that receives an instruction stream including a plurality of instructions that form the source code, the instruction stream including both scalar and vector information. The compiler injects data parallel select instructions into the instruction stream to form a modified instruction stream wherein conditional test and branch instructions are replaced with data parallel select instructions. The compiler also revises the modified instruction stream to enhance execution of the data parallel select instructions, thus providing a revised modified instruction stream. The compiler further generates vectorized code from the revised modified instruction stream.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3 shows a flowchart depicting a data parallel select operation that is usable by the disclosed methodology.

FIG. 11A shows a flowchart depicting an exemplary output of a hyperblocking method in coded detail.

FIG. 11B shows a flowchart that provides additional detail with respect to phi-node conversion to generate select operations.

FIG. 16 shows a flowchart that depicts a methodology for select predicate combining.

FIG. 19A shows a flowchart depicting the operation of a methodology for generating code with select optimizations from FIG. 18.

FIG. 19B shows a flowchart representing the operation of the vector culling methodology of FIG. 17.

DETAILED DESCRIPTION

Figure 1:
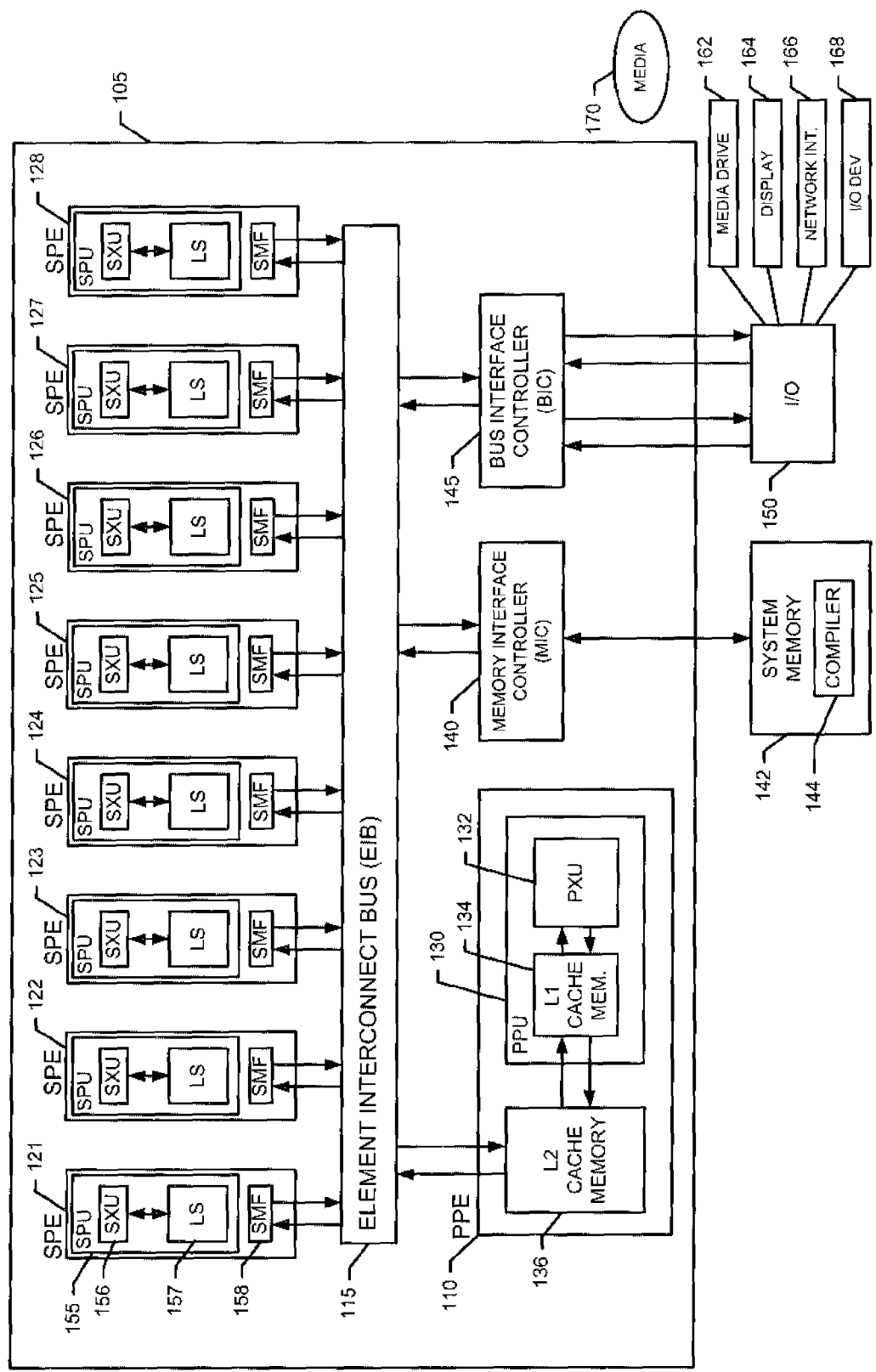
FIG. 1 shows a block diagram of an information handling system (IHS) employing a processor that uses the disclosed compiler optimization technology.

FIG. 1 shows a block diagram of a representative information handling system (IHS) 100 employing a processor 105 that uses the disclosed software processing technology. In one embodiment, processor 105 utilizes the processor architecture described in the publication "Cell Broadband Engine Architecture, Version 1.0", by IBM Corp, Sony and Toshiba, Aug. 8, 2005, the disclosure of which is incorporated herein by reference in the entirety. Processor 105 is a heterogeneous processor, namely a processor including at least one general processor unit having a first instruction set and at least one other processor unit having an architecture and instruction set different from that of the general purpose unit. For example, the other processor unit may be a specialized processor unit or special purpose processor.

In the particular embodiment shown in FIG. 1, processor 105 is a heterogeneous processor that includes a general processor unit 110, for example a Power Processor Element (PPE) employing a RISC instruction set, coupled via an element interconnect bus (EIB) 115 to eight synergistic processor elements (SPEs) employing a single instruction multiple data (SIMD) instruction set, namely processors 121, 122, . . . 128. More particularly, PPE 110 includes a Power Processor Unit (PPU) 130 including a processor execution unit (PXU) 132 that couples to an L1 cache memory 134 therein. An L2 cache memory 136 couples to L1 cache memory 134 as shown. A memory interface controller 140 couples EIB 115 to a system memory 142, namely volatile storage. System memory 142 includes a compiler 144. A bus interface controller (BIC) 145 couples processor 105 to an I/O hub 150. I/O hub 150 couples to I/O devices such as a media drive 162, a display 164, a network interface 166, or other I/O device 168. Media drive 162 provides non-volatile storage to IHS 100. In one embodiment, media drive 162 may provide non-volatile storage for a compiler, an operating system, software applications and other information. Media 170 may store such compiler, operating systems, software applications and other information in a disk or other form factor. In one embodiment, media drive 162 may contain media 170 within media drive 162. Network interface 166 provides wired or wireless communications between IHS 100 and other IHSs. In actual practice, IHS 100 may take many forms. For example, IHS 100 may take the form of a desktop, server, portable, laptop, notebook, or other form factor computer or data processing system. IHS 100 may take other form factors such as a gaming device, a personal digital assistant (PDA), a portable telephone device, a communication device or other devices that include a processor and memory.

In one embodiment, PPE 110 controls processor tasks and SPEs 121, 122, . . . 128 perform data intensive processing tasks assigned by PPE 110. SPEs 121-128 are available to act as accelerators for tasks such as information compression, information decompression as well as other information handling tasks. A representative SPE 121 includes at least one synergistic processor unit (SPU) 155. SPU 155 includes a synergistic execution unit (SXU) 156 coupled to local storage (LS) 157. SPU 155 further includes at least one synergistic memory flow control (SMF) 158 that couples to element interconnect bus (EIB) 115 as shown. Remaining SPEs 122, 123 . . . 128 include structures similar to those of representative SPE 121. In one embodiment, processor 105 is a heterogeneous multi-core processor, namely a processor including 2 different types of processor units. In one embodiment, PPE 110 is a general purpose flexible processor core whereas representative SPE 121 exhibits greater specialization in the sense that SPE 121 does not handle external interrupts and it does not handle full addressability to memory.

To take advantage of the parallelism opportunities that multiple special purpose SPUs offer to IHSs requires extensive and complex software code development with respect to parallelism. Moreover, for this type of computing environment to exploit parallelism, IHSs need more efficiently generated software code. IHSs using conventional software code typically deal with an abundant number of conditional test and branch sequences. When a processor executes such a branch sequence, the processor selects one of a number of possible choices or branches. Test and branch sequences may cause disruption in a processor pipeline flow when the processor attempts to predict the correct branch in advance of branch execution. Such test and branch sequences may negatively impact parallel processing of software code in conventional IHSs.

Figure 2:
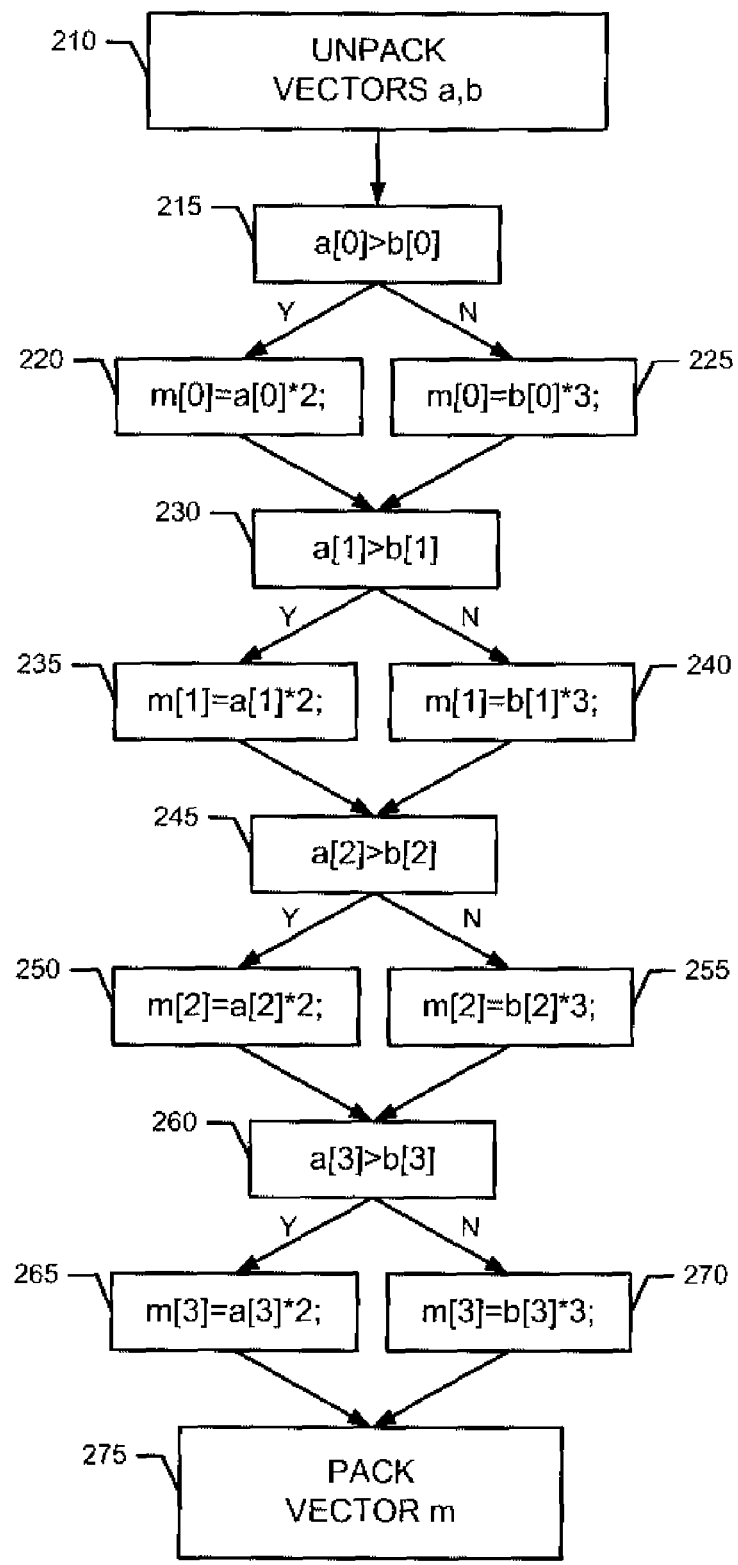
FIG. 2 shows a flowchart depicting a conventional test and branch based execution.

FIG. 2 is a flowchart that depicts the execution of a conventional test and branch operation. For example, a processor may employ the process flow shown in FIG. 2 to execute the straightforward C code test and branch operation that TABLE 4 depicts below.

TABLE 4

```
for (i=0; i<VL; i++)
If (a[i]>b[i])
    m[i] = a[i]*2;
else
    m[i]=b[i]*3;
```

Vectors "a" and "b" denote four element wide vectors. The group a(0), a(1), a(2), a(3) determines the "a" vector, and the group b(0), b(1), b(2), b(3) determines the "b" vector. The term "i" is a conventional software integer that increments from a value of 1 to vector length VL. In this particular example, vector length VL=4. The TABLE 4 code modifies vector "m" according to the particular branch that the processor takes when the test and branch operation executes.

Execution of the test and branch operation of TABLE 4 begins at block 210 of the FIG. 2 flowchart. To operate on vector elements in a scalar environment, the processor first unpacks the vectors "a" and "b" into their respective vector elements, as per unpacking block 210. Unpacking a vector into its constituent vector elements provides access to the vector elements during discrete execution of the code. In particular, the processor performs operations on the individual vector elements during the execution sequence. In this example, processor 100 initially tests vector elements a[0] and b[0] to determine if a[0]>b[0], as per block 215. If the test of block 215 evaluates as true, flow continues to block 220 wherein the test and branch sequence sets vector m[0]= a[0]*2. If the test of block 215 evaluates false, then the test and branch sequence sets vector element m[0]=b[0]*3, as per block 225.

Next, the processor tests vector elements a[1] and b[1] to determine if a[1]>b[1], as per block 230. If the test of block 215 evaluates as true, flow continues to block 235 wherein the test and branch operation sets vector m[1]=a[1]*2, as seen in the simplified test and branch condition that TABLE 4 depicts. If the test of block 230 evaluates as false, then the test and branch sequence sets vector element m[1]=b[1]*3, as per block 240. Subsequently, the processor tests vector elements a[2] and b[2] to determine if a[2]>b[2], as per block 245. If the test of block 245 evaluates as true, flow continues to block 250 wherein the test and branch sequence sets vector m[2]= a[2]*2. If the test of block 245 evaluates as false, then the executing program sets vector element m[2]=b[2]*3, as per block 255.

Finally, the processor tests vector elements a[3] and b[3] to determine if a[3]>b[3], as per block 260. If the test of block 260 evaluates as true, flow continues to block 265 wherein the test and branch operation sets vector m[3]=a[3]*2. However, if the test of block 260 evaluates as false, then the test and branch sequence of the program sets vector element m[3]=b[3]*3, as per block 270. The previous sequence of events modifies or builds the vector elements of the vector "m". The processor then packs the individual vector elements to create a completed vector "m", as per block 275. The above described method represents a conventional scalar or serial approach to test and branch based operations that typically cause undesired high latency. This high latency effect results from both unpacking and packing operations, subsequent detailed operations, as well as scalar tests of individual elements for vectors "a" and "b".

The above test and branch approach is inherently inefficient in a pipeline operating environment. In particular, this approach causes disruption of pipeline flow primarily due to data misprediction events and limitations on instruction scheduling freedom. Moreover, this approach incurs high latency because the operations are inherently scalar and typically can not exploit parallelism. This conventional test and branch operation does not recognize single instruction multiple data (SIMD) vectorized operands and spends additional instructions to convert vectorized form to scalar form, and then back again to vectorized SIMD form after execution. To use conditional branch operations, a compiler must typically first translate a simple element-wise data selection into a sequence of scalar conditional tests, each followed by a data-dependent branch. These data-dependent branches are prone to high branch misprediction rates. A method is needed to eliminate branches and replace them with branch-free instruction sequences that are readily vectorizable in an SIMD environment.

FIG. 3 is a flowchart that depicts a "data parallel select operation" methodology for executing the source code of TABLE 4 above. In contrast to the serial execution methodology of FIG. 2, the data parallel select operation of FIG. 3 processes vectors a and b in a parallel manner. This data parallel select methodology enables select vector-based operations and the elimination of conditional test and branch sequences. The processor executes the same TABLE 4 source code above, except now in accordance with the vector-based parallel methodology that the flowchart of FIG. 3 depicts. Processor 100 provides a data parallel environment for executing the TABLE 4 source code.

The data parallel select operation that FIG. 3 depicts operates on entire vectors in parallel. A vector includes multiple vector elements. A "compute flow", such as compute flow 300, operates on each vector element. The flowchart of FIG. 3 shows 4 vector element results that compiler 144 computes using select operations, namely compute flows 300, 301, 302 and 303. Taken collectively, select-based compute flow operations 300, 301, 302 and 303 form a data-parallel select operation 308. These select-based operations include a data parallel comparison that operates on four vector elements 310, 330, 350, 370. These select-based operations also include a first data parallel multiplication that operates on four vector elements 320, 340, 360, 380, and a second data-parallel multiplication that operates on four vector elements 325, 345, 365, 385. These select-based operations still further include a data-parallel select instruction that operates on four vector elements 315, 335, 355, 375. Advantageously, select-based operations 300, 301, 302 and 303 execute in parallel and may achieve remarkable savings in execution time.

In more detail, the processor evaluates vector elements a[0] through a[3], and b[0] through b[3] as whole vectors. In this example, the processor evaluates vectors "a" and "b" as each exhibiting a vector length of 4 elements. The processor uses the FIG. 3 methodology to generate vector elements m[0] through m[3] as a whole vector "m" in the same operation. In accordance with block 310, the processor generates a select element s[0] corresponding to the first of four vector element positions. If s[0] evaluates to a true condition, namely if a[0]>b[0] equates to true, then select instruction 315 selects the operation of a'[0], as per block 320. This select operation sets the m[0] vector element equal to a[0]*2. However, if s[0] evaluates false as per block 310, then select instruction 315 sets the m[0] vector element equal to b'[0]*3 as per block 325. At this point, the select operation completes with m[0] equal to b[0]*3, provided the comparison of block 310 evaluates false.

In parallel with compute flow or select operation 300 in which s[0] evaluates, a concurrent compute flow on vector element 301 evaluates s[1] as seen in FIG. 3. More particularly, selection vector element s[1] evaluates as true or false per block 330 during concurrent select operation 301. Select block 335 selects either block 340 (a'[1]=a[1]*2) or block 345 (b'[1]=b[1]*3) depending on whether the selection vector element evaluates as true or false. If the selection vector element s[1] evaluates as true as per block 340, then the processor sets m[1] equal to a[1]*2. However, if the selection vector element s[1] evaluates as false as per block 345, then the processor sets m[1] equal to b[1]*3.

Concurrent with the compute flows 300 and 301, the processor also executes compute flow 302. More particularly, s[2] evaluates as true or false, as per block 350. In a manner similar to vector elements m[0] and m[1] discussed above, at block 355 vector element m[2] equals either the true condition shown in block 360 or the false condition shown in block 365. Concurrent with the compute flows 300, 301 and 302, the processor also executes compute flow 303. Compute flow 303 determines the final vector element for "m", namely m[3]. In a manner similar to vector elements m[0], m[1] and m[2] discussed above, at block 375 vector element m[3] equals either the true condition shown in block 380 or the false condition shown in block 385.

Data parallel select operations require no unpacking or packing of vector data. Moreover, the data parallel select operation executes on the vector elements directly. The select operation generates the resultant vector "m" as a whole vector, m[0] through m[3], in this example of a data parallel operation. The disclosed method for conditional execution on an SPU exploits data parallelism and implements conditional execution with a short sequence of data parallel SIMD instructions. A data parallel select sequence replaces the lengthy test-and-branch sequence of FIG. 2 with four instructions (two multiplies, one compare, and a data parallel select instruction) operating on a vector of four elements, in the particular example shown in FIG. 3. By using data parallel if-conversion to execute both paths of a conditional assignment, each path can execute on the full vector, thus effectively reducing the number of executed blocks from once for each vector element (using scalar branch-based code) to once for each execution path for the disclosed methodology. The example of FIG. 3 represents an attractive methodology for data parallel select operation. In one embodiment of the disclosed methodology, a compiler such as compiler 144 of FIG. 1, automatically converts vector-based C code such as shown in TABLE 4 to vector-based code including data parallel select operations. In this manner, an IHS employing the disclosed conversion methodology achieves improved code execution efficiency.

Parallel execution offers significant advantages over the control-dominated compare-and-branch sequences. If-conversion in the disclosed methodology creates opportunities for using transformations that enhance instruction level parallelism such as software pipelining. Beyond these instruction level benefits of if-conversion, data parallel select operations provide a basis for exploiting data-level parallelism. Historically, predicated branch techniques and the approach of executing both paths or branches suffered from unbalanced then-else paths, wherein one execution path is inordinately longer than the other, or the distribution between execution probabilities is widely skewed. In a data parallel environment, these trade-offs are more favorable for the data parallel select approach. In applying predication to scalar code, the number of executed instructions corresponds to the sum of the instructions that execute along either execution path. To offset the resultant increased instruction count, scalar predication reduces branch prediction penalties and improves code scheduling In applying predication to SIMD execution, data parallel select operations offer an aggregate path length advantage by exploiting data-level parallel SIMD processing in addition to the advantages of predication. This SIMD path length feature offsets the potential cost of misbalanced then-else paths. Predication applied to SIMD execution may reduce path length to the aggregate path length of the sum of instructions along one instance of a short path and one instance of a long path, compared to the sum of instructions on p*w short paths, and (1−p)*w long paths, where p is the probability of executing a short path for a given execution, and w is vector width. This makes data parallel select operations attractive except for very skewed probabilities or highly non-uniform distributions within these probabilities.

A data parallel select operation may convert a data-driven branch sequence prone to high misprediction rates into a data flow operation. A data parallel select operation may remove conditional branch instructions that are hard to predict statically from the instruction mix, thus skewing the mix toward easier to predict branches. Increasing sequential control flow also increases opportunities for sequential fetch and reinforces the advantages of a static scheduling architecture. A data parallel select architecture integrates with a data parallel compare architecture. In one approach, all compare operations produce a data-width-specific control word to feed as a control input into the data parallel select operation. The result in the leftmost element slot (preferred slot) of a vector is a potential input for a conditional branch instruction. In one embodiment, an SPU implements two types of compare operations for each data type, namely one type of compare operation for equality and one type of compare operation for ordering. Compilers and assembly language programmers may derive all other conditions by inverting the order of operands (for compare and select operations) and by testing the condition or the inverted condition (for branch instructions). The data parallel select operation in an SIMD SPU environment significantly improves performance over traditional test and branch execution.

Figure 4A:
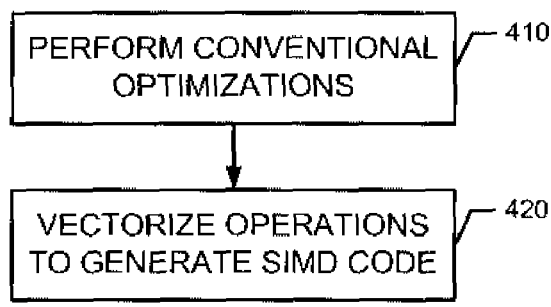
FIG. 4A shows a flowchart depicting a conventional method of generating SIMD code.

FIG. 4A is a flowchart that depicts a conventional methodology for performing code optimization and generating vectorized operations in a parallel environment. A processor performs conventional optimizations on source code, such as dead code elimination for example, as per block 410. If the compiler 144 encounters code that is no longer relevant or useful, the compiler removes the so-called dead-code to more efficiently use memory and to increase program execution speed. Other techniques useful in block 410 optimization include instruction scheduling, common subexpresssion elimination, and hyperblocking. A programmer may perform the above operations manually.

After performing the conventional optimization of block 410, the processor may then vectorize operations in the source code to generate SIMD code, as per block 420. TABLE 5 shows an exemplary implementation corresponding to the C source code given in TABLE 4 for a vector length (VL) of 4. More particularly, starting with the source code of TABLE 4 a manual conversion process may produce the code shown below in TABLE 5.

TABLE 5

```
; setup:
; (1) split vectors a (in v1) and b (v2)
; into elements v10 to v13 and v20 to v23
; (2) initialize vectors v102=2.0, v103=3.0
    fcgt v0, v10, v20
    brz v0, selb0
    fm  v30, v10, v102
    br  done0
selb0:
    fm  v30, v20, v103
done0:
    fcgt v0, v11, v21
    brz v0, selb0
    fm  v31, v11, v102
    br  done1
selb1:
    fm  v31, v21, v103
done1:
    fcgt v0, v12, v22
    brz v0, selb0
    fm  v32, v12, v102
    br  done2
selb2:
    fm  v32, v22, v103
done2:
    fcgt v0, v13, v23
    brz v0, selb0
    fm  v31, v13, v102
    br  done3
selb3:
    fm  v31, v23, v103
done3:
; reformat data:
; merge elements v30 to v33 into single
; result vector v3
```

The representative source code of TABLE 5 exhibits a number of undesirable properties. For example, the representative source code includes short basic blocks that are not amenable to static branch prediction mechanisms.

Figure 4B:
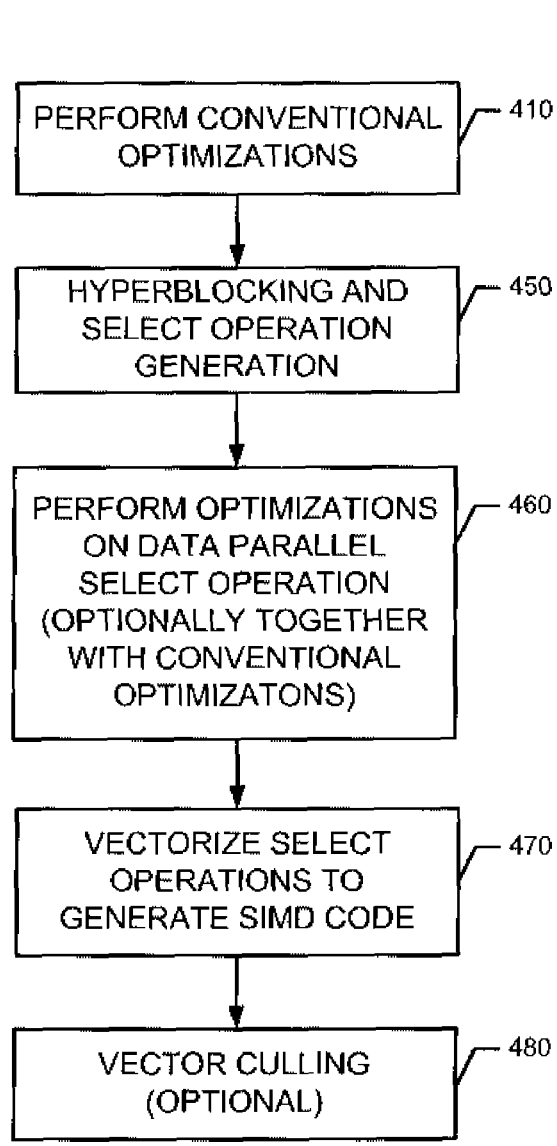
FIG. 4B shows a flowchart representing a method of generating SIMD code using the disclosed data parallel select methodologies.

FIG. 4B is a flowchart that depicts one embodiment of a code conversion methodology that includes disclosed optimizations for data parallel select operations that may combine with conventional optimizations of operations. For example, in one embodiment, processor 100 may first perform the same conventional code optimizations 410 that the methodology of FIG. 4A performs. Compiler optimizations improve the efficiency (in terms of run time or resource usage) of the coded executables output by a compiler. In general, optimization techniques allow programmers to write source code in straightforward language, expressing their intentions clearly, while allowing the compiler to make choices about implementation details that lead to efficient execution in the current usage environment. After performing the optimization of block 410, the compiler 144 forms hyperblocks from the existing coded sequences and generates select operations, as per block 450. Hyperblocking is a compiler technique of looking at a group of code and interpreting the group of code as a whole for expanded optimization opportunities. In particular, hyperblocking allows the compiler to make decisions on the group of code rather than evaluating each individual line of code. Select operations involve the generation of data parallel select lines of code where conditional branches currently exist. One example of combining the terms of hyperblocking and select generation as per block 450 is for the compiler 144 to evaluate "if" and "else" statements at the same time and to substitute a data parallel select operation in their place. Then, as per block 460, the compiler performs optimizations on the modified source code it receives from block 450. More specifically, compiler 144 performs optimizations with respect to data parallel select operation as shown in more detail below. Optionally, the compiler performs these optimizations in conjunction with traditional conventional optimizations such as dead code elimination.

At a high level, the compiler 144 performs optimizations to increase efficiencies relevant to data parallel select operations, as per block 460. The compiler performs these optimization procedures during the conversion of source code to the final compiled code. The "select promotion" procedure is one such optimization procedure wherein the compiler promotes or moves identified select operations ahead of other coded operations for efficiency. "Select sinking" provides another optimization that the compiler may apply to a data parallel select operation. In select sinking, the compiler gains efficiencies by modifying the order of select operations to execute after other operations in the compiled code. In block 460, the compiler may also apply a "select fusion" procedure to data parallel select operations found in the source code. During the select fusion procedure, the compiler combines multiple select operations into a single select operation in the final compiled code. "Select unification" is another optimization procedure that the compiler may use for data parallel select operations in optimization block 460. When the compiler encounters a select operation that selects the same terms, the compiler removes the select operation and replaces that code with a single operation that does not use the data parallel select operation. And finally, a "select predicate combining" procedure is another optimization that the compiler may employ in optimization block 460 for data parallel select operations. During the select predicate combining procedure, the compiler combines select predicate logic into a single data parallel select operation. "Select combining" is a term that collectively includes "select fusion, select unification, and select predicate combining". In combination with the select promotion, select sinking and select combining optimization methodologies of block 460, the compiler may also perform conventional optimizations such as per block 410 on data parallel select operations. The compiler may again perform the optimization procedures of block 410 because the hyperblocking and select generation steps generate a new modified sequence of codes, as per block 450.

As per block 470, the compiler vectorizes the code that results from the optimizations of block 460. In this step, the compiler vectorizes the code by using known vectorization techniques for computational operations, such as described by Bik et al., "Automatic Intra-Register Vectorization for the Intel Architecture", International Journal of Parallel Programming, 2002, and Eichenberger et al., "Optimizing Compiler for the Cell Processor", Conference on Parallel Architectures and Compilation Techniques, 2005, both of which are incorporated herein by reference in their entirety. Finally, the compiler may employ an optional vector culling operation, as per block 480. Vector culling is a technique that the compiler employs to remove, or simplify, execution flow in one or more hyperblocks for entire vectors. Moreover, the compiler performs vector culling when all elements of a vector share the same condition. For strongly biased branches or misbalanced then-else paths, vector culling can provide a performance optimization for the compiled code with respect to data parallel select operations. The compiler removes or culls processing on vectors when computation follows a common condition for all vector elements. In this manner, computation can be simplified when the entire vector corresponds to one execution path through a conditional computation.

Using the methodology of FIG. 4B, compiler 144 compiles the source code of TABLE 4 to generate a converted code such as shown in TABLE 6 below. In other words, the disclosed method employs source code as an input and generates the converted code of TABLE 6 as a representative output. In particular, the number following the vector register indication "v" represents a specific register number. Moreover, each vector register of TABLE 6 holds several elements. TABLE 5 above depicts a more detailed example of vector elements wherein vector registers v1 holds elements v10 to v13, and wherein vector register v2 holds elements v20 to v23, respectively.

TABLE 6 fcgt v0, v1, v2 (floating point compare greater than)
fm  v10, v1, v102 (floating point multiply)
fm  v20, v2, v103 (floating point multiply)
selb v3, v10, v20, v0 (select b, placing contents of v10 or v20 into v3)

Figure 5:
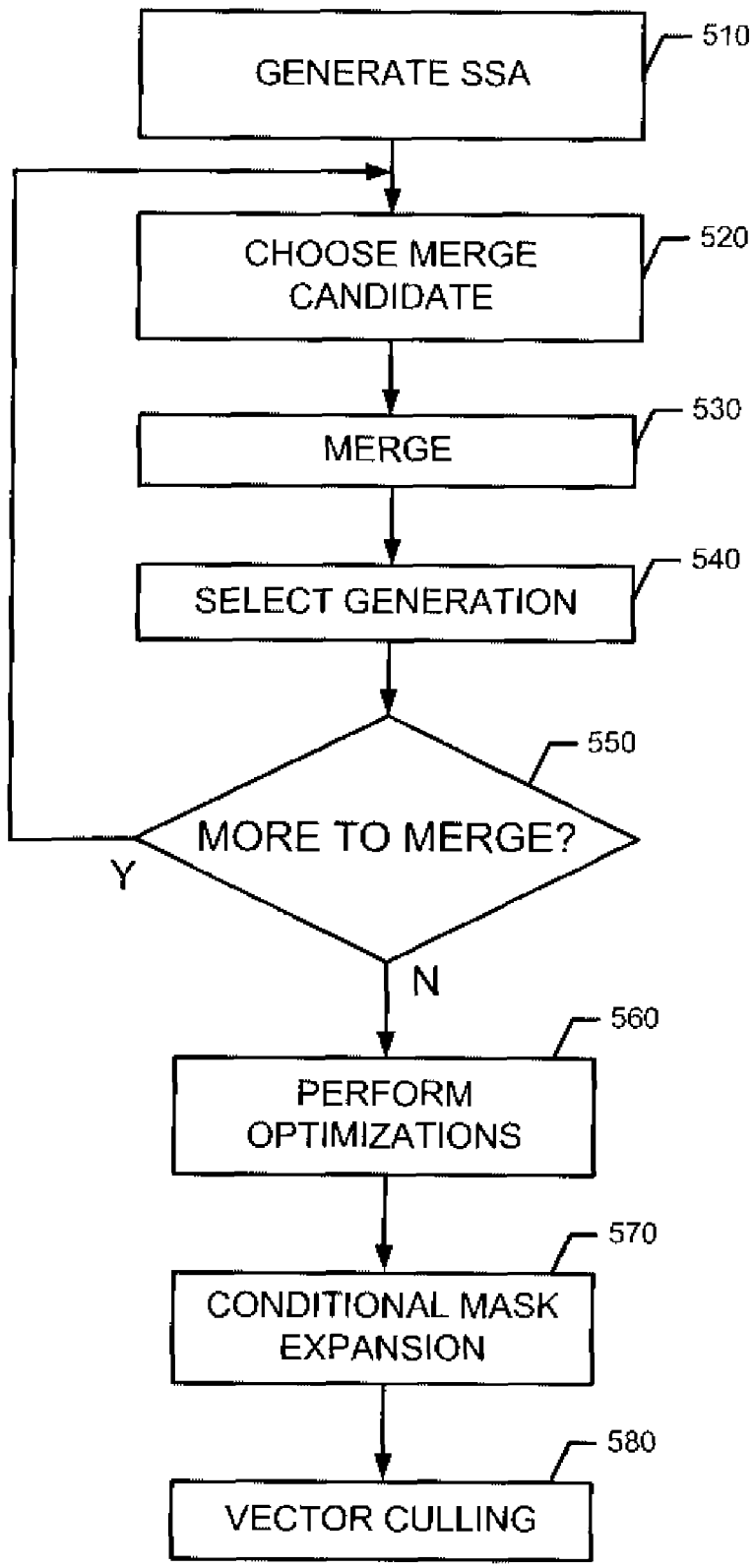
FIG. 5 shows a flowchart depicting the disclosed data parallel select generation methodology.

FIG. 5 is a flowchart that depicts one aspect of the disclosed methodology. In particular, FIG. 5 depicts a process flow that efficiently generates select operations in a manner in accordance with the optimizations herein. Moreover, FIG. 5 represents efficient vectorization of select operations using the disclosed methodology. The compiler generates internal representations of the programmer-supplied input program or source code, using the known static single assignment (SSA) form, as per block 510. The compiler selects one or more basic blocks for merging and select generation by use of a cost function, as per block 520. In one aspect of the disclosed methodology, the compiler applies a cost function to select basic blocks wherein data parallel select operation will likely be beneficial for performance. In another aspect of the disclosed methodology, specific programmer supplied directives may guide the selection of basic blocks. The compiler defines basic blocks as grouped sections of code that do not include any branches, jumps, or targets in the middle. Basic blocks represent the basic unit to which compiler optimizations apply. The compiler merges a minimum of two basic blocks, demonstrating the hyperblocking methodology, as per block 530.

Next, the compiler performs select generation, preferably using the phi-node conversion conditional store conversion steps, as per block 540, as disclosed below. Phi-node insertion is a technique that the disclosed compiler methodology uses internally to efficiently represent the selection of a value from a first and second path in a control flow join. A control flow join represents a point in a control flow graph where the paths of two different conditional branches merge. Flow graphs are a representation of compiled code as shown in detail by individual basic blocks. Each basic block in the compiled code is a flow graph node and represents a single element in the flow graph. In an SSA representation, each time the compiler assigns a vector, the compiler creates a new variable. An example of such a new variable is the variable "a", to which an if-else statement may assign different values. In this case, the compiler may create variables a1 and a2 for the subsequent variable assignments. Once the program moves past branches for a1 and a2, the compiler may not know which variable data to use for a. Inserting a phi node, before interpreting the next value of a, such as b=$\phi$ (a1, a2), eliminates the problem by allowing the compiler to pick which value of a, namely a1, or a2 is the correct one based on the previous flow graph. In another aspect of the select generation methodology, the compiler uses conditional store conversion to convert conditional stores into select operations. The compiler then performs a test as per decision block 550 to determine if another basic block is mergeable into the current merge candidate. If the test decision block 550 finds another basic block to merge, namely the test answer is yes, then flow continues back to block 520 which considers the next basic block as a merge candidate. However, if the test of decision block 550 is no, flow continues to block 560 wherein the compiler performs a number of optimizations with respect to a data parallel select operation. These optimizations include select promotion, select sinking, select fusion, select unification, and a select predicate combining procedure with respect to data parallel select. The optimizations may optionally include conditional store conversion, conditional mask expansion, a basic block-level select generation optimization procedure, vector culling, dead code elimination, a phi-node conversion procedure and hyperblocking.

In some embodiments the compiler combines these optimizations with a conditional mask procedure, as per block 570. The compiler generates vector masks appropriate for masked select operations, as per block 570. Finally, the compiler executes a vector culling procedural step that performs vector culling, as per block 580. The compiler may employ vector culling to optimize performance for strongly biased branches, those with a skewed distribution, or for optimizing code with very misbalanced then-else paths. The optimization steps taught herein are usable in conjunction with other known or future select operation generation steps.

Figure 6:
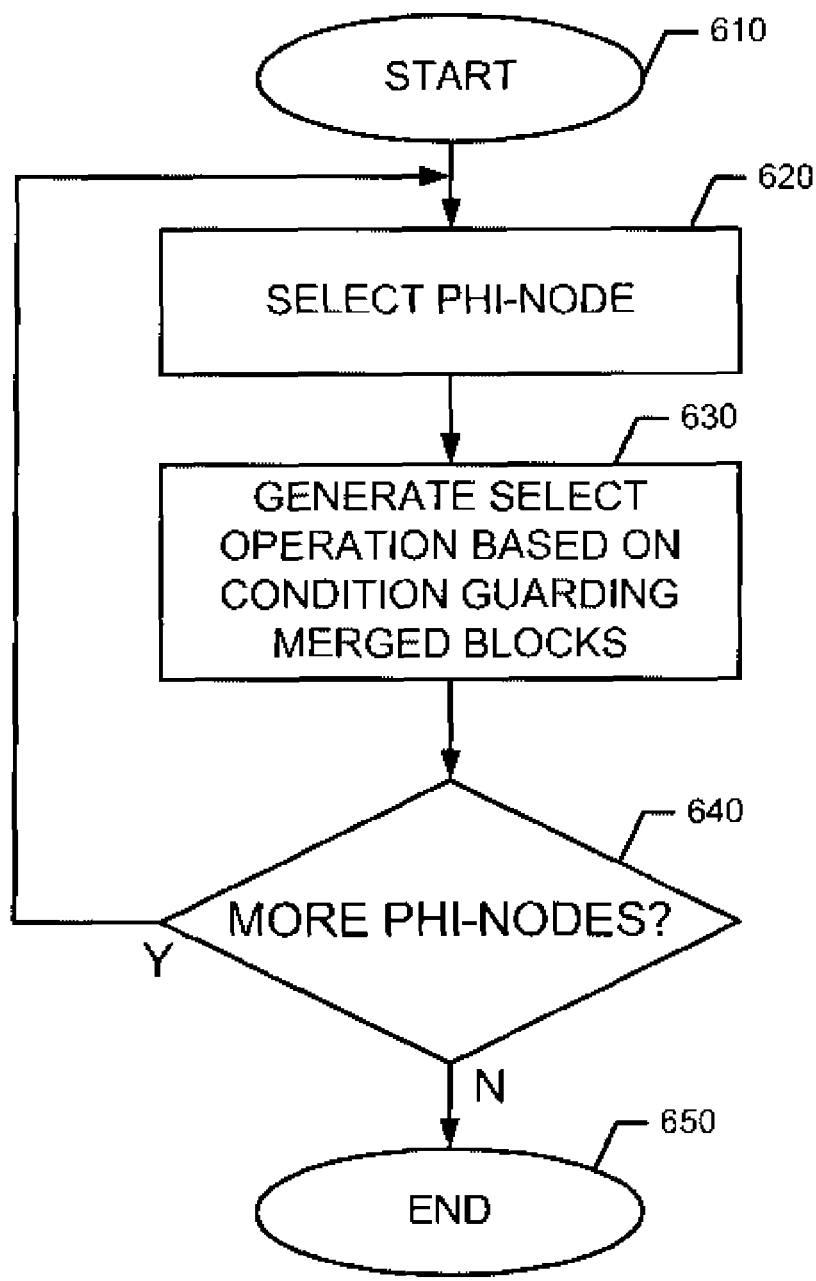
FIG. 6 shows a flowchart that provides detail with respect to select phi-node conversion.

FIG. 6 is a flowchart that discloses more detail with respect to one phi-node conversion technique usable as optimization block 450 of the flowchart of FIG. 4B or the select generation block 540 of the flowchart of FIG. 5. Ideally, the compiler performs phi-node conversion step in conjunction with hyperblock generation. Phi-node conversion begins at start block 610 and employs SSA form code in this particular example. The compiler selects a phi-node for conversion, as per block 620. Block 630 depicts the generation of a select operation based on the condition guarding the merged blocks. Guarding conditions include a required phi-node step that executes between two basic merged blocks. Next, the compiler performs a test to determine if more phi-nodes require conversion, as per decision block 640. If more phi-nodes require conversion, the test yields a yes and control returns to block 620 from which flow continues. However, if more phi-nodes do not require conversion, the test yields a no and the phi-node conversion method ends at block 650.

In one embodiment, phi-node conversion applies only to phi-nodes corresponding to a control-flow merge between basic blocks that the compiler combined into a single hyperblock. The compiler may not convert phi-nodes at the entrance of a hyperblock when that hyperblock is the target of a control flow merge. In one embodiment the compiler may expand phi-nodes, having more operands than a select operation in a specific target instruction set architecture supports, into a sequence of phi-nodes. In particular, a representative instruction set architecture supports a maximum of two operands that a single condition selects.

In one embodiment of the phi-node conversion optimization methodology, the compiler injects data parallel select instructions into an instruction stream to form a modified instruction stream. The compiler then merges at least two basic blocks of the modified instruction stream. The compiler also identifies a phi-node in the modified instruction stream wherein the phi node corresponds to a conditional path through one basic block of the modified instruction stream. The compiler then generates a select operation in the modified instruction stream by selecting between a value corresponding to a computation on the conditional path and another value.

Figure 7:
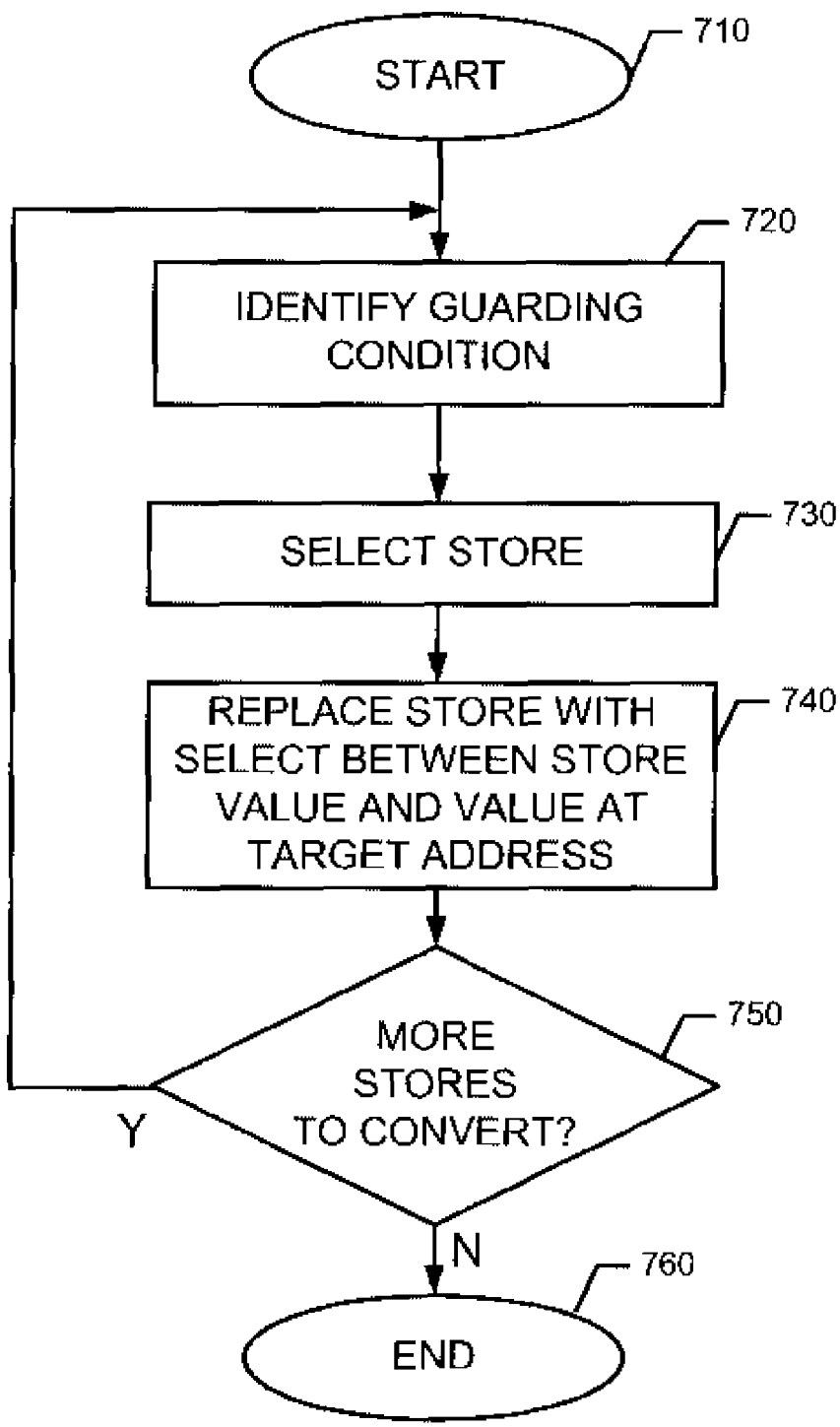
FIG. 7 shows a flowchart depicting a conditional store conversion methodology.

FIG. 7 is a flowchart that provides more detail with respect to the above conditional store conversion methodology wherein conditionally executed store operations (under the control of a guarding control statement) convert into vectorizable sequences of select and store operations. Referring now to select operations in SIMD instruction set architectures, one aspect of SIMD architectures supports a select operation that exhibits the following functionality with respect to the SPU select bits instruction. In accordance with the definition of the select bits instruction (selb rt,ra,rb,rc), for each of 128 bit positions, the compiler takes the following action. Processor 100 includes select bits rt,ra,rb,rc (not shown) in system memory 142. If the bit in register rc is 0, then the compiler selects the bit from register ra. Otherwise, the compiler selects the bit from register rb. The compiler then places the selected bit into register rt. To implement a slot select, wherein the compiler selects either a first value from a slot in register ra, or a second value in a slot in register rb, a control mask in register rc encodes the select condition by specifying a series of 0s or 1s across the entire slot. To accomplish this, the condition should exhibit the desired width corresponding to the select element type data width. In one embodiment, the compiler performs a conditional mask expansion by taking a single Boolean condition and expanding it to a mask that includes either 0s or 1s in the appropriate slot.

The conditional store conversion method begins at start block 710. The compiler identifies guarding conditions, i.e. the condition associated with the execution of a particular conditional path, as per block 720. The select store procedure then identifies coded conditional store operations, as per block 730. The compiler replaces selected conditional stores with data parallel select operations between the store value and the value at a target address. The compiler then performs a test to determine if more conditional stores exist to convert, as per decision block 750. If the compiler determines that more conditional stores exist to convert, then decision block 750 yields a yes, and control moves to block 730 to continue the conditional store conversion process. However, if more stores are not available for conversion, decision block 750 yields a no and control moves to end block 760 at which the conditional store conversion process ends.

In one embodiment of the conditional store conversion optimization methodology, the compiler injects data parallel select instructions into an instruction stream to form a modified instruction stream. In the modified instruction stream, the compiler identifies a store operation that corresponds to one conditional path in a hyperblock in the modified instruction stream. The compiler then replaces the identified store operation with a program sequence including a select operation that selects a stored data value based on a condition of the conditional path and the identified store operation.

Figure 8:
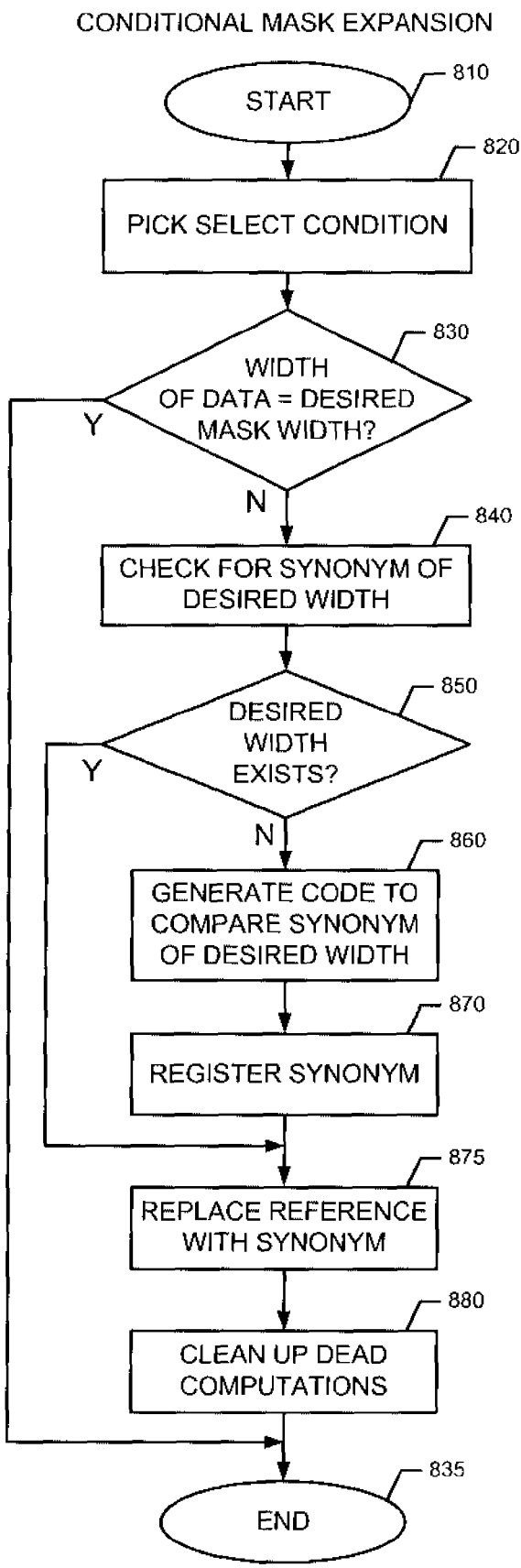
FIG. 8 shows a flowchart representing a conditional mask expansion methodology.

FIG. 8 is a flowchart that depicts a methodology for conditional mask expansion. A conditional mask expansion procedure takes a single Boolean conditional operation and expands the Boolean condition to a mask including either 0's or 1's that apply to the appropriate vector element. Process flow commences at start block 810. The conditional mask expansion operation chooses a select condition, as per block 820. The compiler conducts a test at decision block 830 to determine if the width of the data that this operation masks equals a desired mask width. If the width of the data the compiler seeks to mask equals a desired width, then the desired width test yields a yes, and control moves directly to end block 835 at which execution ends. However, if the width of masked data does not equal the desired width, then the desired width test of decision block 830 returns a no. In this case, flow continues and the compiler checks for a synonym of the condition having the desired width, as per block 840. A synonym is an alternate representation of a condition that the compiler encodes. Subsequently, the compiler may encode the condition TRUE as "1" in one instance, and "1111" in another instance. If the compiler can find a synonym of the desired width, the compiler need not perform a conditional mask expansion. In one optimized embodiment, the compiler tracks synonyms to allow efficient implementation of the test per block 840. If the synonym for the desired width exists, then decision block 850 returns a yes and flow moves to block 855 wherein synonym information replaces the reference data. If the synonym for the desired width does not exist, then decision block 850 yields a no result and flow continues to block 860. At block 860 an operation generates code to compare the synonym of the desired width. Following the successful operation of block 860, the compiler registers the synonym, as per block 870. Moreover, the compiler tracks synonyms to allow efficient implementation of the test of block 840. The synonym data replaces the reference data, as per block 875. The compiler cleans up dead computations, as per block 880. Dead computations include lines of source or compiled code that exhibits no relationship to the executing program. The compiler may eliminate these lines of code without loss of data or program relevance. The conditional mask expansion ends at end block 835.

In one embodiment of a conditional mask expansion optimization methodology, the compiler injects data parallel select instructions into an instruction stream to form a modified instruction stream. In the modified instruction stream, the compiler identifies an assignment to a field of a value which corresponds to a wide data word. The compiler aligns that value to a position corresponding to a position in the wide data word for updating purposes. The compiler then generates a select mask for a data parallel select operation wherein the select mask selects a first operand corresponding to non-assigned fields in the wide data word and a second operand corresponding to assigned fields in the wide data word. The complier then generates a select operation that selects from the wide data word and the aligned value under control of the select mask.

In one hardware implementation that the method of FIG. 8 employs, compare instructions generate masks of the comparison data width, so that the method requires no additional steps and the computed mask is immediately available. In other cases, such as when the compiler performs a test on values of one width to select values of another width, the compiler may need to perform expansion. In that case, the compiler may often efficiently perform the expansion with a single permute or shift algebraic operation. In another embodiment, the compiler generates select instructions to implement partial writes to data elements allocated within a vector register. TABLE 7 below provides such an example.

TABLE 7

Struct vertex {
   Float x,y,z,w;
} v;

Considering the C language structure code in TABLE 7, that shows desirable allocation to a 128 bit vector register, each of the vertex coordinates x, y, z, w corresponds to a respective vector slot. Common write operations such as (v.w=norm;) require the compiler to update a single slot. In one embodiment, the disclosed methodology generates select operations for this sequence. The compiler generates select operations using an instruction sequence such as the code structure shown in TABLE 8 below.

TABLE 8

| li rslots, 1 | ; slots 0001 |
|---|---|
| fsm rmask, rslots | ; expand condition to mask |
| rotqmbyi rtmp, rnorm, 12 | ; rotate right |
| selb rv, rv, rtmp, rmask | ; select |

Code generating procedures may create code with select instructions at the basic block-level. Moreover, the coded sequence operation inserts a single field into a vector using the data parallel select instruction technique. Subsequently, during compilation, the compiler may convert select instructions at the basic block-level into a common select statement. In reference to the coded structure of TABLE 8, the compiler selects a first value i from one register, and original values a.y, a.z, and a.w, from a second register to form a new target register. Next, the compiler updates the corresponding vertex vector. The sample code of TABLE 9 shows the resulting coded sequence of the basic block-level operation.

TABLE 9 struct {
   float x,y, z, w
   } vertex;
vertex a;
float i;
a.x = i

Figure 9:
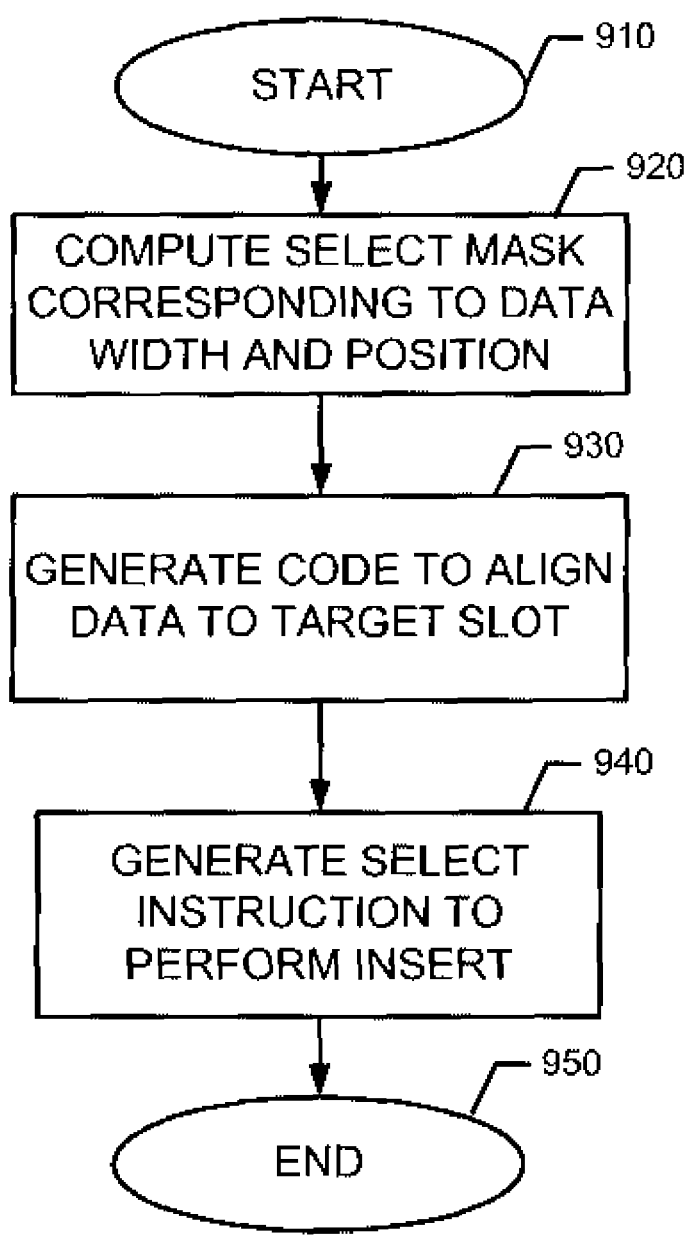
FIG. 9 shows a flowchart depicting a basic block-level select generation method.

FIG. 9 is a flowchart that depicts a methodology for basic block-level select generation. The method commences at start block 910. The compiler computes a select mask that corresponds to the data width and insertion position of a data item or value, as per block 920. The compiler then generates code to align program data with a target vector slot, as per block 930. In one embodiment, this includes a test to determine if a synonym of appropriately aligned required data already exists, such as an element of another vector. If the aligned data already exists, the compiler may then use the synonym. Using the synonym in this manner is desirable because it reduces unnecessary alignment and re-alignment, and increases opportunities for predicate combining during code optimization. Next, the compiler generates a select instruction that performs an insert operation, as per block 940. The insertion operation takes selected data fields from a first data source and a second data source. Then the compiler inserts these selected data fields in the first data source for storage as a merged vector word. Process flow then ends at end block 950.

TABLEs 10A and 10B below show the performance of optimizations to efficiently allow multiple field updates. More specifically, TABLE 10A shows multiple fields for updating.

TABLE 10A v.x = newplane.x
v.y = newplane.y

TABLE 10B below shows a method for updating the multiple fields of TABLE 10A above.

TABLE 10B

| li rslots, 12 | ; slots 1100 |
|---|---|
| fsm rmask, rslots | ; expand condition to mask |
| selb rv, rv, rnewplane, rmask | ; select |

In one embodiment, the compiler executes the method of TABLEs 10A and 10B multiple times, for each of the slot elements x and y, followed by select predicate combining at the SIMD level.

Figure 10:
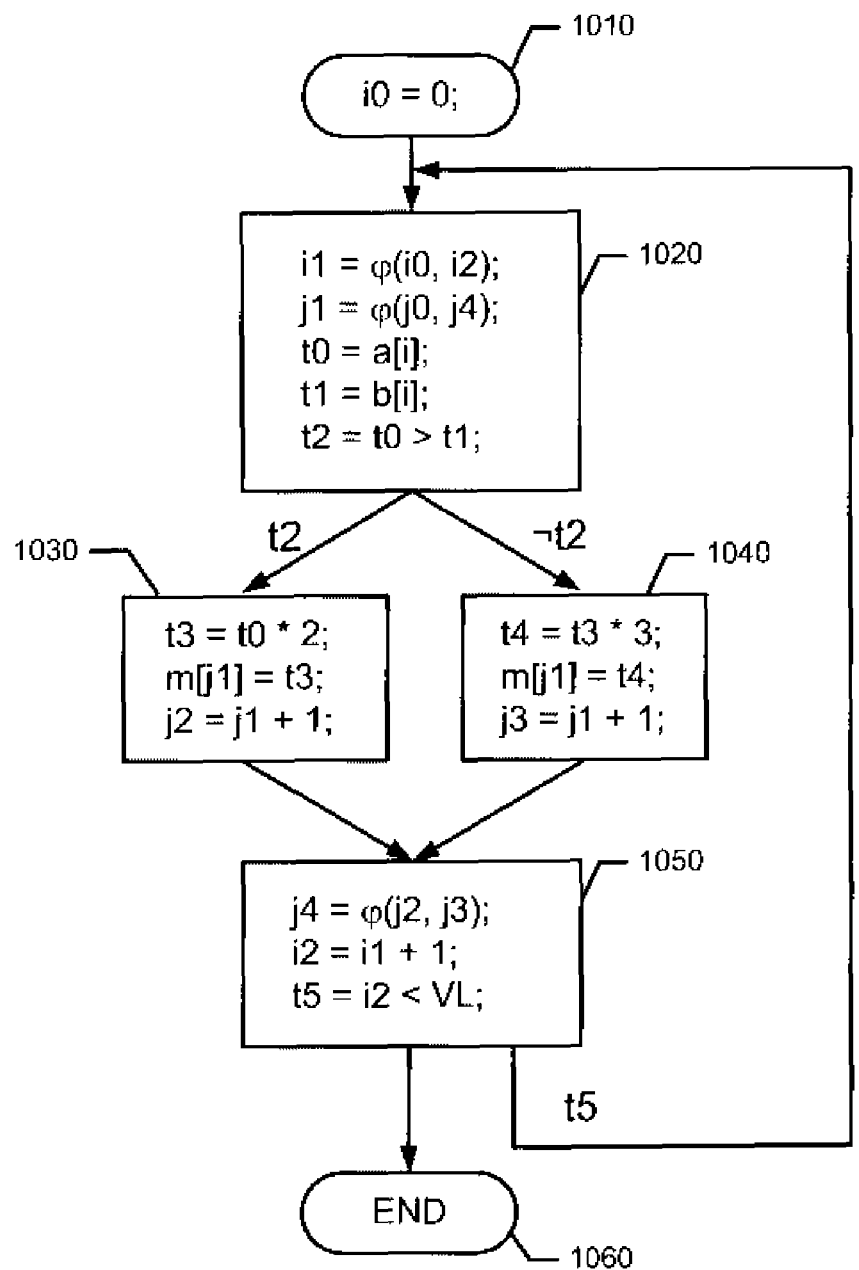
FIG. 10 shows a flowchart detailing a representative conditional execution sequence in expressed coded arguments.

The compiler performs the methods represented by figures, FIG. 5-FIG. 9, as it works to generate an executable program from the source code of TABLE 4. FIG. 10 is a flowchart showing the internal compiler representation for the representative example of TABLE 4 above that depicts conditional code execution. Flow begins at block 1010 with the initialization of i0=0. The compiler performs phi-node operations for i1 and j1, as per block 1020. The compiler also assigns a[i] and b[i] to t0 and t1 respectively. Block 1020 represents a basic block in compiling architecture. The compiler executes a conditional control flow test on t2, as per block 1020. If the test of t2 returns a true result, namely if t0>t1, then flow continues to block 1030 at which the compiler assigns t0*2 to t3 and further assigns t3 to the vector element m[j1] and still further assigns j1+1 to j2. However, if the test of t2 returns a false result, flow continues to block 1040 at which the compiler assigns t3*3 to t4, and further assigns t4 to vector element m[j1], and still further assigns j1+1 to j3. The assignments t2, and ¬t2 employ a notation wherein ¬indicates the logical negation of a Boolean value or a false test result. Blocks 1030 and 1040 respectively represent different branch selections dependent upon the result of the test of t2=t0>t1 that block 1020 performs. Each of blocks 1030 and 1040 represents a sequence of vector events.

Flow converges at block 1050 that includes a phi-node for this execution sequence. More specifically, the compiler performs a phi-node operation on j4 and computes i2 as i1+1. Finally the compiler performs a test on t2 to determine if j2<VL, wherein VL is a test vector length. If t5 evaluates false such that the vector length VL is not satisfied, then flow returns to block 1020 per t5 such that the process continues until the full vector length is satisfied and process flow ends at end block 1060.

FIG. 11A is a flowchart showing a hyperblocking technique that the compiler may perform on the flow graph of FIG. 10. Again, per the representative coding example in TABLE 4, FIG. 11A depicts code execution after the compiler removes and replaces conditional branches with sequential t2 and ¬t2 blocks. The hyperblocking process of the hyperblocked code commences by initializing i0=0, as per block 1110. Control flow then continues to block 1120 wherein the compiler performs phi-node operations for i1 and j1. In this block, the compiler also assigns a[i] and b[i] to t0, and t1, respectively. Code block 1120 also performs a test on t2 to determine if t0 is greater than t1. The test of t2 yields either a true or false result for t2. The flow graph contains both t2 true and t2 false blocks in sequential steps starting with t2 true, as per block 1130. During this phase, basic blocks associate with guarding conditions corresponding to the condition under which the associated path in the original code executes. At block 1130, initially without regard to true or false conditions of the t2 test in block 1120, the compiler assigns t0*2 to, t3, and further assigns t3 to vector element m[j1,] and still further assigns j1+1 to j2.

After completing the t2 block 1130, the compiler proceeds to ¬t2 block 1140. The compiler then assigns t1*3 to t4, and further assigns t4 to vector element m[j1], and still further assigns j1+1 to j3 are assigned as shown in block 1140.

The compiler next commences a phi-node operation, as per block 1145. The compiler completes the phi node operation j4 and assigns i1+1 to i2. Next, the compiler performs a test t5 on the vector length, VL, and flow returns to block 1120 per t5 if the vector length satisfied test returns a false result. Returning from block 1145 to block 1120 in this manner forms a program loop. If the vector length test returns a true result, this indicates satisfaction of the vector length test t5, so that the the program loop then completes and control flow ends at end block 1147. Blocks 1130 and 1140 correspond to basic blocks 1030 and 1040 in FIG. 10. Finally, in the example of FIG. 11A, the compiler predicates the basic blocks and places the predicated basic blocks in a sequential order annotated (top left of each box) with execution predicate (t2, and ¬t2, wherein ¬indicates the logical negation of a Boolean value. Hyperblocking allows the compiler to look at all four basic blocks 1120, 1130, 1140, and 1145 respectively at the same time and make optimization decisions based on this new whole entity. In traditional conditional assignment flow, the compiler typically evaluates each basic block without regard to the other blocks.

FIG. 11B is a flowchart that illustrates the operation of a method for phi-node conversion. Taking again the source code example of TABLE 4, and based on hyperblocked code shown above in FIG. 11A, the compiler initializes i0=0, as per block 1150. The compiler next performs phi-node operations for i1 and j1 as per block 1160. Further, in block 1160, the compiler assigns a[i] and b[i] to t0, and t1, respectively. Block 1160 also performs a test on t2 to determine if t0 is greater than t1. The test of t2 yields either a true or false result for t2. The control flow graph contains both t2 true and false blocks in sequential steps starting with t2 true, as per block 1170. At block 1170, the compiler assigns t0*2 to t3, and further assigns t3 to vector element m[j1], and still further assigns j1+1 to j2. The compiler next assigns t1*3 to t4, as per block 1180, that represents t2 false. The compiler also assigns t4 to vector element m[j1], and still further assigns j1+1 to j3, again as per block 1180.

The compiler converts a phi-node j4 to a select statement, as per block 1190. More particularly, if the third condition operand t2, of the select operation statement per block 1190 is true, the compiler assigns the first operand j2 selection to j4. Moreover, if the third condition operand t2 is false, the compiler assigns the second operand j3 selection to j4, as per block 1190. The compiler assigns i1+1 to i2 and also performs a test against the vector length VL, as per block 1190. If the vector length test returns a not satisfied result as per t5, flow returns to block 1160 and execution continues. If the t5 test shows satisfaction of the vector length, namely a true result, the phi-node conversion method step is complete and flow ends at end block 1197.

Figure 12A:
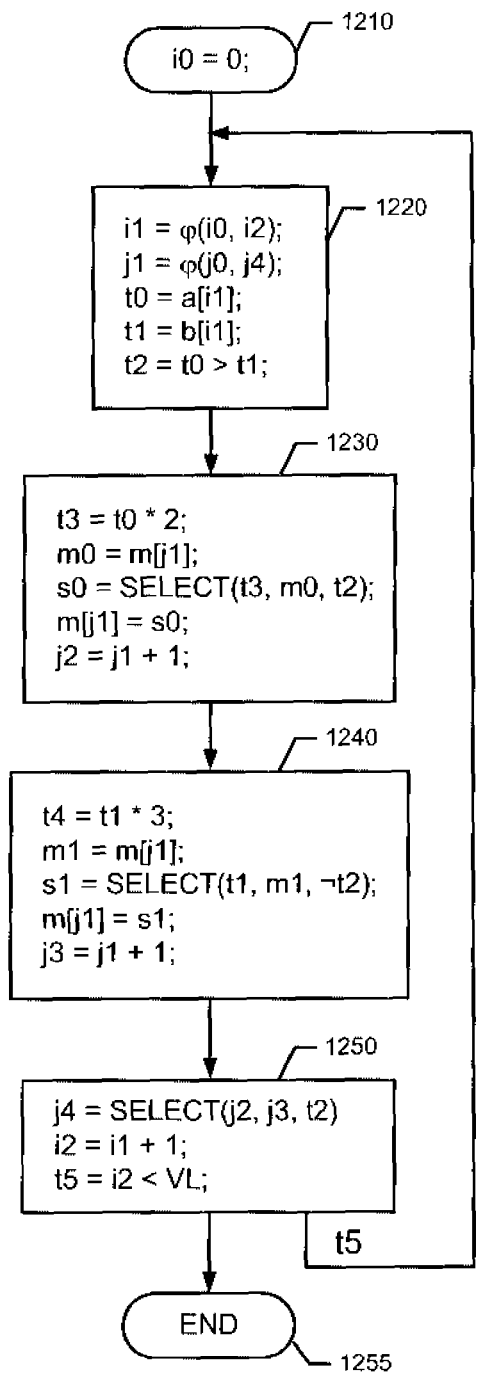
FIG. 12A shows a flowchart that depicts an exemplary output of a conditional store conversion method.

FIG. 12A is a flowchart that illustrates a conditional store conversion operation that relates to the code of TABLE 4. More particularly, FIG. 12A shows conditional store conversion wherein the compiler performs hyperblocking and phi-node conversion as shown in FIGS. 11A and 11B, respectively. The compiler initializes i0=0, as per start block 1210. The compiler then executes phi-nodes i1 and j1 phi-nodes, as per block 1220. The compiler assigns a[i1] and b[i1] to t0 and t1, respectively, also as per block 1220. Next, a test assignment for t2 executes as t0>t1, the assignment relating to the basic source code example of TABLE 4.

If the test t2 evaluates as true, the compiler assigns t0*2 to t3 and also assigns mb[j1] to vector element m0, as per block 1230. Next, a select operation executes for s0. The compiler also assigns s0 to vector element m[j1] and further assigns j1+1 to j2. The m[j1] assignment represents the conditional store conversion methodologies detailed for the predicated basic block example of coding TABLE 4. The compiler passes flow for the false condition of the t2 test to t2 false block 1240. Per block 1240, the compiler assigns t1*3 to t4, and further assigns m[j1] to vector element m1. Next, the compiler assigns a data select operation to s1. The compiler also assigns s1 to vector element m[j1], and further assigns j1+1 to j3. The m[j1] assignment represents the conditional store conversion for this predicated block. Continuing to block 1250, j4 executes a data-select operation and the compiler assigns i1+1 to i2. Finally, if the vector length test t5 returns a result of not completed, flow returns to block 1220 as per t5 and compilation continues. However, if the vector length returns a completed result, the compiler operation ends as per end block 1255. Blocks 1220, 1230, 1240, and 1250 may together be viewable as a whole to represent a hyperblocking opportunity for the compiler to introduce additional efficiencies and optimizations.

Figure 12B:
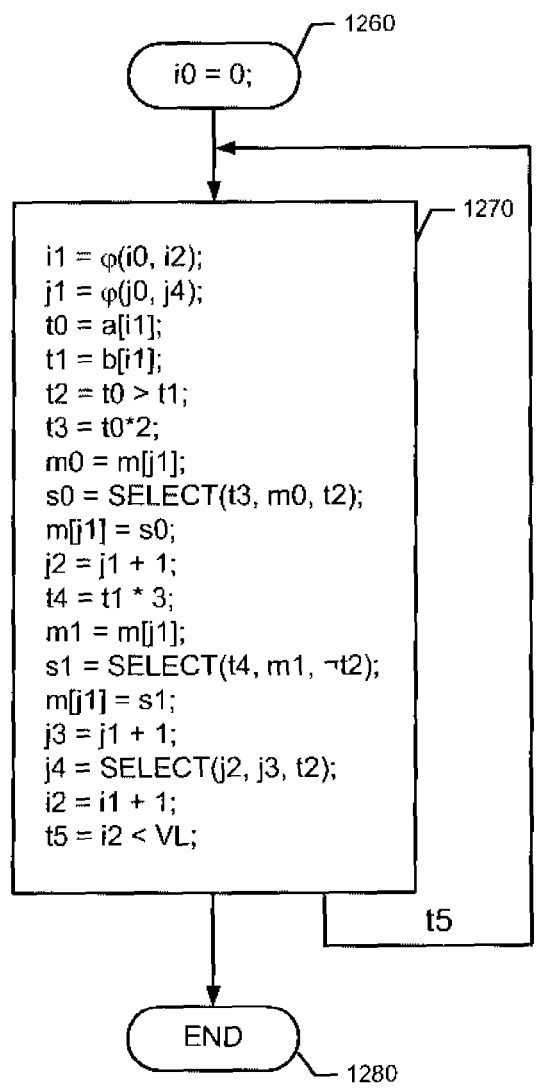
FIG. 12B shows a flowchart that provides additional detail with respect to merging hyperblocks into a single block.

FIG. 12B is a flowchart depicting the merger of the constituent blocks of a hyperblock into a new, single block offering increased optimization and scheduling opportunities for still further optimizations. Process flow commences with the initialization of i0=0, as per block 1260. Block 1270 shows the same code lines of blocks 1220, 1230, 1240 and 1250 of FIG. 12A all merged into one hyperblock that the compiler may interpret for further optimizations and efficient scheduling options. Block 1270 ends with the test of vector length t5=i2<VL and returns to re-execute block 1270 until the vector length test returns a completed result and the operation ends per block 1280.

The compiler preferably combines select generation with new classes of data-select optimizations. Select optimizations include, but are not limited to: "select promotion", wherein the compiler promotes select operations ahead of other operations in a data flow graph, and "select sinking", wherein the compiler reorders select operations for execution after other operations in a data flow graph. More particularly, a select operation corresponds to selecting the results of two replicated copies of an arithmetic operation to replace a sequence with select operations feeding a computational operation. Select optimizations also include "select fusion", wherein the compiler combines multiple select operation statements in a single select operation statement, "select unification" wherein the compiler detects select operations selecting the same term that combine into a single non-selected term, and "select predicate combining", wherein select operations combine into a single select operation by combining select predicates. The described steps apply to both scalar and SIMD select operations. The figures described below show additional optimization methodologies that complier 144 may employ in the disclosed embodiments. The functions shown in TABLE 11 represent function descriptions that the compiler uses in some of the flowcharts below. Moreover, the compiler uses the functions of TABLE 11 in an exemplary embodiment that operates on an intermediate representation of the compiling code.

TABLE 11

| | |
|---|---|
| setting_op(ix) | receives an internal expression ix as input, returns operation which is top-level compute op in an assignment, i.e., a = b + c returns ADD |
| src1(ix) | receives an internal expression ix as input, returns the first input operand to the top level operation in an assignment, i.e., calling src1 with an expression a = b + c or b + c returns b |
| src2(ix) | receives an internal expression ix as input, returns the second input operand to the top level operation in an assignment, i.e., a = b + c returns c |
| src3(ix) | receives an internal expression ix as input, returns the third input operand to the top level operation in an assignment, i.e., a = fma(b, c, d) returns d |
| dest(ix) | receives an internal expression ix as input, returns the destination operand to the top level operation in an assignment, i.e., a = b + c returns a |
| setting_stmt(ix) | receives an internal expression ix as input which the function expects to be a variable reference, will return an internal expression corresponding to the internal expression which computes this argument; i.e., setting_stmt (a) will return an internal expression corresponding to the internal expression which computes a, i.e., "a = b + c" |

TABLE 11-continued

| | |
|---|---|
| select_op(s1, s2, ct) | receives 3 internal expressions, returns an expression for a select operation having s1 and s2 as data inputs, and ct as control input; i.e., select_op(a, b, c) returns "select(a, b, c)" |
| gen_op(op, s1, s2, . . .) | receives an operation code, and a variable number of internal expressions, generates an expression with the specified operation, and sources; i.e., gen_op(ADD, a, b) generates "a + b" |
| and_op(s1, s2) | receives two internal expressions, and generates a new expression combining the two sources with the AND operation; equivalent to gen_op(AND, s1, s2); and_op(s1, s2) returns "s1 AND s2" |
| or_op(s1, s2) | receives two internal expressions, and generates a new expression combining the two sources with the OR operation; equivalent to gen_op(OR, s1, s2) or_op(s1, s2) returns "s1 OR s2" |
| not_op(s1) | receives an internal expression, and generates a new expression combining the two sources with the OR operation; equivalent to gen_op(NOT, s1) not_op(s1) returns "NOT s1" |
| assign(var, ix) | receives an expression describing a variable (l-value in accordance with the definition of the C programming language), and a complex operation (R value in accordance with the definition of the C programming language), i.e., assign (t1, t2) generates "t1 = t2" |
| insert(ix) | inserts an internal expression into a basic block. In SSA, inserts at a point before the first use of the destination, and after the definition of all sources. |

Figure 13:
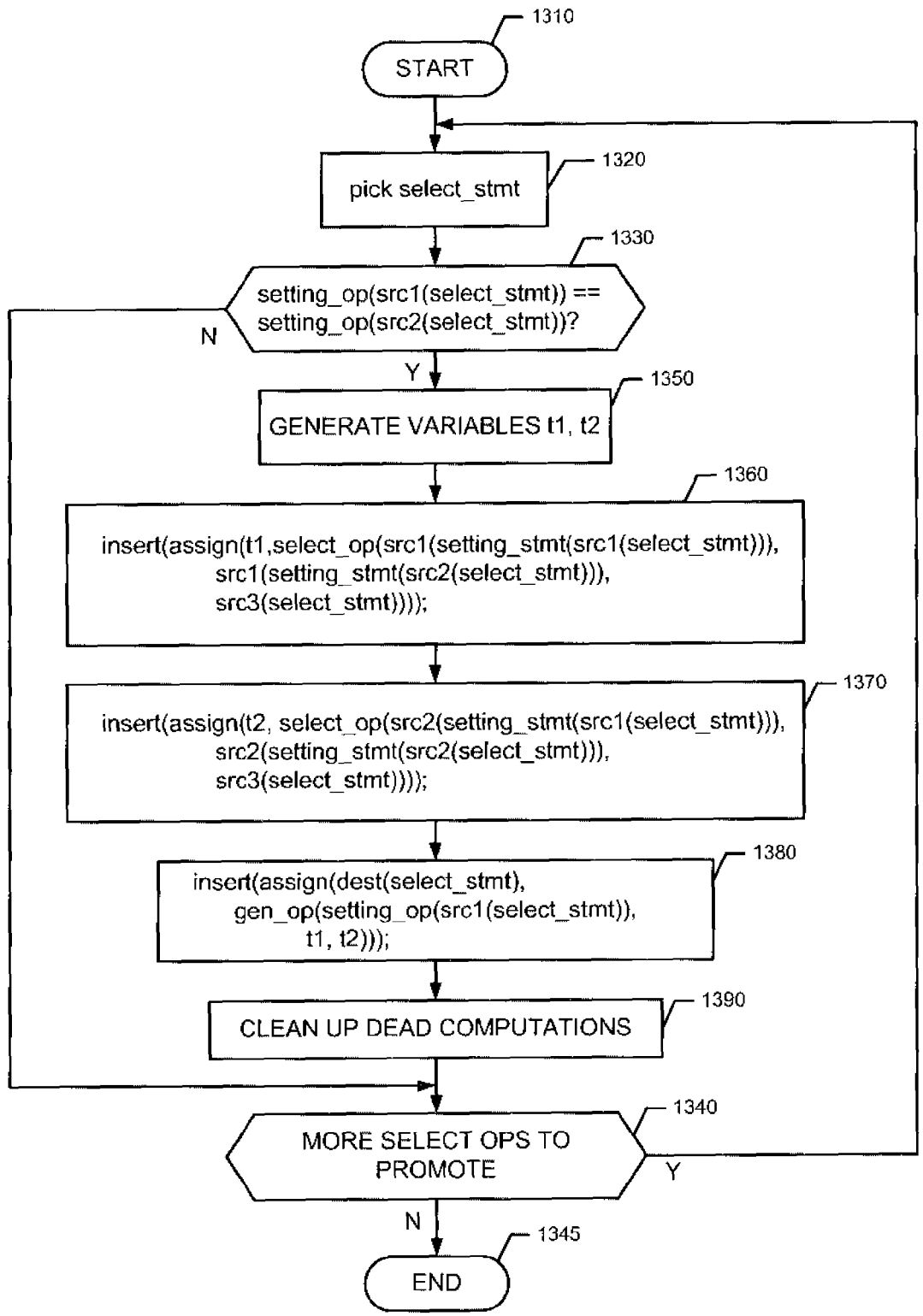
FIG. 13 shows a flowchart depicting a methodology for select promotion.

In one embodiment using SSA form, the insert of a new definition for a variable which is already defined automatically, deletes a prior definition of the same variable. In another embodiment, the compiler programmer inserts explicit function calls wherein avoiding duplicate assignments FIG. 13 is a flow diagram that represents the disclosed methodology for select promotion, wherein the compiler promotes select operations ahead of other operations in a data flow graph. To further illustrate this optimization, consider the code wherein, t=select(a+1, b+a, condition). Simple forms of select promotion will generate, t=select(a,b, condition)+select(1,a,condition). In particular a preferred form of select promotion includes a test to determine if (commutative (setting_op (src1(select_stmt))) && src1(setting_stmt(src1(select_stmt)))!=src1(setting_stmt(src2(select_stmt))) && src1(setting_stmt(src1(select_stmt)))==src2(setting_stmt(src2(select_stmt)))) and interchanges the source operands, leading to an improved intermediate representation of t=select(a,a, condition)+select(1,b,condition). The compiler may perform additional optimizations if desired including, but not limited to, select unification on the select(a,a,condition) term, to generate a simplified result of t=a+select(1,b, condition).

In more detail, the compiler initializes the select promotion operation, as per start block 1310. The compiler then identifies a select_stmt argument to perform the select promotion optimization operation, as per block 1320. The compiler performs a test to determine if the same semantic operation, namely the same type of operation, feeds both src1 and src2, as per block 1330. An example of two operations that exhibit the same type, namely the same semantic type, is two addition operations. Another example of two operations with the same semantic type is two multiplication operations. If the semantic comparison test of setting_op(src1(select_stmt)) and setting_op(src2(select_stmt)) returns a false result, the compiler performs a test to determine if more select operations are available to promote, as per block 1340.

However, if the test for more select operations returns a true result, the compiler selects the next select-stmt on which to perform select promotion optimization, again as per block 1320. If the test for additional select operations returns a false result, the select promotion operation is complete and flow ends at end block 1345.

Returning to block 1330, if the semantic comparison test of setting_op(src1(select_stmt)) and setting_op(src2(select_stmt)) returns a true result, the compiler select promotion operation passes flow to block 1350. The compiler generates two intermediate variables t1 and t2, as per block 1350. Next, the compiler inserts a statement into the intermediate representation with the insert statement insert(assign(t1,select_op(src1(setting_stmt(src1(select_stmt))), src1(setting_stmt(src2(select_stmt))), src3(select_stmt)))), as per block 1360. In block 1360, the compiler inserts a statement into the intermediate representation, by selecting from the first inputs of the first and second operation feeding the select statement chosen in block 1320.

Next, the compiler inserts a statement into the intermediate representation selecting from the second inputs of the first and second operations feeding the select statement chosen in block 1320, as per block 1370. Also, as per block 1370, the compiler inserts a select statement shown by insert(assign(t2, select_op(src2(setting_stmt(src1(select_stmt))), src2(setting_stmt(src2(select_stmt))), src3(select_stmt)))).

The compiler then generates, in block 1380, a new arithmetic operation using the particular select statement chosen in block 1320, and the select results that block 1360 and block 1370 of the first and second select operations produce, respectively. In block 1380 the compiler assigns the generated arithmetic operation as seen by the coded representation of insert (assign(dest(select_stmt), gen_op(setting_op(src1(select_stmt)), t1, t2))).

The compiler performs a dead code elimination operation at block 1390 to eliminate any identifiable unused code. Next, the compiler performs a test to determine if more select operations are available to promote and process flow continues as described per block 1340.

In one embodiment of the disclosed select promotion optimization methodology, the compiler injects data parallel select instructions into an instruction stream to form a modified instruction stream. The compiler identifies a program sequence in the modified instruction stream wherein a select operation associates with two selection sources corresponding to two operations of the same type. The two selection sources including input operands. The select operation yields a result computation after processing by the compiler. The compiler then replaces the result computation of the select operation with at least one other select operation corresponding to a selection of at least one of the input operands. The output of the at least one other select operation feeds another operation of the same type.

In yet another optimized aspect of select promotion, the compiler provides the select promotion operation shown in FIG. 13 with a capability of effectively understanding commutative aspects of operations, and reorders operands to improve opportunities for select optimizations including, but not limited to, select fusion.

Select sinking provides another optimization that the compiler may optionally apply to a data parallel select operation. In select sinking, the compiler gains efficiencies by modifying the order of select operations to execute after other operations in the compiled code. Select sinking is a variation from select promotion. In one embodiment of a select sinking optimization methodology, the compiler identifies a first program sequence in an instruction stream wherein at least one select operation of the first program sequence selects from two values that feed another operation exhibiting a type, wherein the another operation yields a result computation. The select sinking method also includes replacing the result computation with a second program sequence in which a select operation selects from two computed values, each of the two computed values corresponding to an operation of the type of the another operation.

Figure 14:
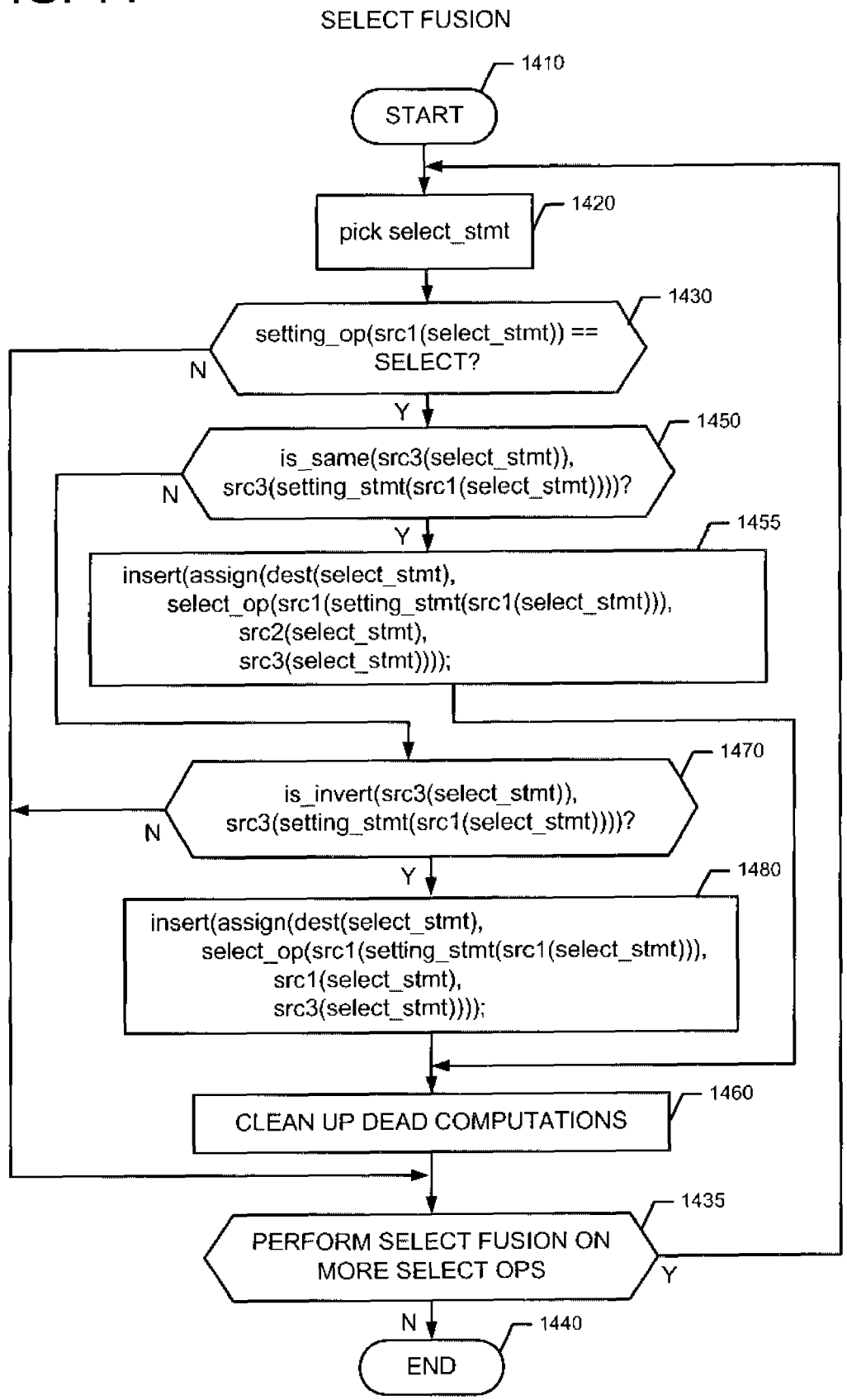
FIG. 14 shows a flowchart of a methodology for select fusion.

FIG. 14 is a flow diagram that represents the methodology for select fusion, wherein the compiler combines select operations sharing the same conditions. The compiler initializes the select fusion operation, as per start block 1410. The compiler then identifies a select-stmt argument on which to perform the select fusion optimization operation, as per block 1420.

The compiler performs a test at block 1430 to determine if a select operation provides an input to the select operation chosen in block 1420. Per block 1430, if the test for input setting_op(src1(select_stmt))==SELECT? returns a false result, the compiler determines that the select operation chosen in block 1420 is not a candidate for select fusion. The compiler then performs a test to determine if more select operations are available for the select fusion operation in block 1435.

If the test for more select fusion operations of block 1435 returns a true result, the compiler selects the next select_stmt on which to perform select fusion optimization, again as per block 1420. If the test for additional select operations returns a false result, the select fusion operation is complete and flow ends at end block 1440.

If the test for input of block 1430 returns a true result, the compiler select fusion operation passes flow to block 1450. The compiler performs a test in block 1450 to determine if the select condition of the select instruction chosen in block 1420 and the feeding select instruction for src1 share the same condition. The compiler then executes the coded sequence is_same(src3(select_stmt)), src3(setting_stmt(src1(select_stmt))))? for the test, as per block 1450. If the test of block 1450 returns a true result, the compiler determines that the select statement chosen in block 1420 can benefit directly from select fusion.

The compiler then generates a new select instruction, as per block 1455. In block 1455 the compiler selects from a source of the select statement feeding the chosen statement per block 1420 and a source of the select statement under control of the common select condition. In block 1455 the compiler uses the coded sequence insert(assign(dest(select_stmt), select_op (src1(setting_stmt(src1(select_stmt))), src2(select_stmt), src3(select_stmt)))) for the new select instruction generation.

The compiler performs a dead code elimination operation at block 1460. In this operation the compiler eliminates any identifiable unused code The compiler performs a test at block 1435 to determine if any additional opportunities for select fusion exist and flow continues.

Returning to block 1450, the compiler performs a test to determine if the select condition of the select instruction chosen in block 1420 and the feeding select instruction for src1 share the same condition. If the compiler test of block 1450 returns a false result, the compiler then performs a test to determine if the select condition for the chosen select instruction of step 1420 and the feeding select instruction for src1 share the same condition, but in an inverted form, as per block 1470. The compiler uses the coded sequence is_invert (src3(select_stmt)), src3(setting_stmt(src1(select_stmt))))? to perform the test for inverted form in block 1470.

If the compiler test of block 1470 returns a false result, flow continues again to block 1435 wherein the compiler performs a test to determine if more select operations exist that will benefit from select fusion. If the test of block 1470 returns a true result, the compiler determines that the select statement chosen by block 1420 can benefit from the select fusion operation.

The compiler generates a new select instruction using the coded sequence insert(assign(dest(select_stmt), select_op (src1(setting_stmt(src1(select_stmt))), src1(select_stmt), src3(select-stmt)))), as per block 1480. In other words, the compiler generates the new select instruction by selecting from a source of the select statement feeding the chosen select statement, and a source of the select statement under control of the common select condition. The compiler then cleans up dead computations, as per block 1460. The select fusion operation continues until flow ends, as per block 1440.

In one compiler implementation, the compiler may employ canonical representations. Canonical representations reduce the number of tests, for the compiler, during the select fusion optimization operation.

In one embodiment of a select fusion optimization methodology, the compiler injects data parallel select instructions into an instruction stream to form a modified instruction stream. The compiler identifies a program sequence in the modified instruction stream wherein a first select operation provides an input value into a second select operation, wherein predicates of the first and second select operations select a subset of input operands of the first select and second select operation input values. The compiler replaces the second select operation with a select operation that selects from the subset.

Referring now to select unification, the compiler performs a test to determine if src1 and src2 inputs to a select operation are identical. If the terms src1 and src2 are identical, the compiler replaces the select operation with an assignment to scr1. In another aspect of select unification, the compiler includes a test for constant select conditions. The compiler may perform further optimizations in conjunction with the select unification operation if desired.

In one embodiment of a select unification optimization methodology, the compiler injects data parallel select instructions into an instruction stream to form a modified instruction stream. The compiler identifies a select operation in the modified instruction stream, wherein the first and second input values corresponding to selection in the case of a true predicate are the same as the first and second input values corresponding to the case of a false predicate. The compiler replaces the select operation with an assignment of one of the first and second input values.

For further descriptive uses of the disclosed methodologies, TABLE 12 below describes a coding sequence representing a sample data select operation.

TABLE 12 x6 = x0 + x1;
x7 = x2 + x3;
x8 = select(x6, x7, x4)

As seen in TABLE 12, the compiler assigns the result of x0+x1 to x6. The compiler also assigns x2+x3 to x7. Finally, the compiler assigns a select operation for x8 with internal assignments of x6,x7, and x4 respectively.

TABLE 13 below shows a code sequence that the compiler generates when employing select promotion methodology on the code of TABLE 12 at a detailed coded level.

TABLE 13 t1 = select(x0, x2, x4);
t2 = select(x1, x3, x4);
x8 = t1 + t2

As seen in TABLE 13, the compiler assigns a select operation for t1 with internal assignments of x0, x2, and x4. The compiler also assigns a select operation for t2 with internal assignments of x1, x3, and x4. The compiler further assigns the result of t1+t2 to x8. This represents the disclosed procedure of select promotion at a detailed level.

TABLE 14 below describes yet another and further simplified coding sequence representing a data select procedure.

TABLE 14 x6 = x0 + 1;
x7 = x2 + 1;
x8 = select(x6, x7, x4)

Per TABLE 14, the compiler assigns the resultant of x0+1 to x6 and x2+1 to x7. The compiler assigns a select operation for x8 with internal assignments of x6, x7, and x4. These steps are representative of the disclosed data select optimization methodology.

TABLE 15 below describes another coded sequence that the compiler generates from the coding of TABLE 13 to demonstrate the disclosed methodology of select promotion at a detailed coded level.

TABLE 15 t1 = select(x0, x2, x4);
t2 = select(1, 1, x4);
x8 = t1 + t2;

As seen in TABLE 15, the compiler assigns a select operation for t1 with internal assignments of x0, x2, and x4. The compiler also assigns a select operation for t2 with internal assignments of 1, 1, and x4. The compiler further assigns the result of t1+t2 to x8. The above sequence represents the methodology of select promotion.

Next, the compiler may process the code of TABLE 13 and apply select unification optimization methodology to provide the resultant coding shown in Table 16.

TABLE 16 t1 = select(x0, x2, x4);
t2 = 1;
x8 = t1 + t2;

The compiler assigns a select operation for t1 with internal assignments of x0, x2, and x4, as shown in TABLE 15. The compiler also assigns the value of 1 to t2 and the result of t1+t2 to x8.

The compiler also employs "constant propagation" optimization methodology to further reduce the coding of TABLE 13 to the more efficient coded sequence shown in TABLE 17 below. Constant propagation defines a compiler procedure wherein the compiler reduces variable assignments in term when possible by assigning known constants when the compiler determines known constants at compilation time.

TABLE 17 t1 = select(x0, x2, x4);
x8 = t1 + 1;

As TABLE 17 indicates, the compiler assigns a select operation for t1 with internal assignments of x0, x2, and x4. The compiler also assigns the resultant value of t1+1 to x8. Because t2 equals 1 per TABLE 15, the compiler removes the t2 term of TABLE 15. TABLE 17 then represents the substitution of the number 1 in each place where TABLE 16 previously used t2. In this manner, the compiler employs the disclosed constant propagation optimization methodology to further optimize the code.

Figure 15A:
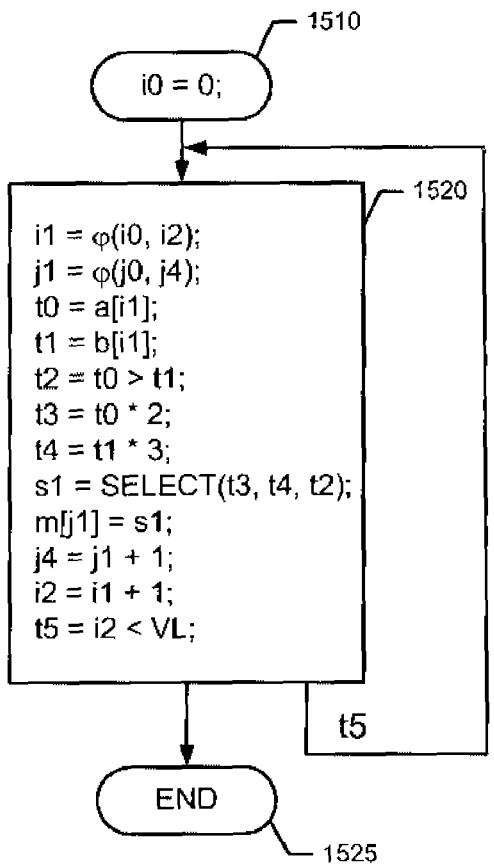
FIG. 15A shows a flowchart that depicts an exemplary output of a select combining methodology.

FIG. 15A is a flowchart that illustrates the operation of select combining. Select combining refers to optimizations combining multiple select operations into fewer select operations, such as select fusion and select unification. FIG. 15A further illustrates with two examples corresponding to the computation of the value of s1, and j4, respectively. More particularly, the compiler combines the SELECT statements of FIG. 12B, computing s0 and s1, respectively, by using select fusion after optimizing the assignment of m1=m[j1]. More specifically, m1 refers to the output s0 of the first SELECT statement prior to the execution of the select fusion optimization. If one of the inputs to the SELECT statement computing s0 is dead, the compiler may eliminate its computation using the known dead code elimination optimization. If one of the inputs to the SELECT statement is not dead, the present optimization offers a height reduction in the data flow graph, thus allowing more efficient use of parallelism. FIG. 15A depicts the initialization of i0=0, as per block 1510. Block 1520 represents the select combining methodology that adapts the source code of TABLE 4 and that applies the optimization methodologies to the merging hyperblocks method of FIG. 12B. In more detail, the compiler performs phi-node operations for i1 and j1. Next, the compiler assigns a[i1] and b[i1] to t0 and t1, respectively. The compiler then assigns the test result of t0>t1 to t2, and further assigns t0*2 and t1*3 to t3 and t4, respectively. As shown, a data select operation then selects s1 based on the method of select fusion of FIG. 14 that the compiler performs on the first and second SELECT operations of FIG. 12B. A dead code elimination procedure eliminates the computations of m0 and m1 of FIG. 12B. The compiler also assigns s1 to vector element m[j1], and further assigns j1+1 to j4, and still further assigns i1+1 to i2. This assignment is the result of select unification on the third SELECT operation of FIG. 12B, which is possible after performing common subexpression elimination and copy propagation on the value of j3 to generate a third SELECT (j2,j2, t2) on the control flow graph of FIG. 12B. The compiler may also perform additional dead code elimination and copy propagation to eliminate computation of j3, and remove additional copy operations. Finally, the compiler performs a test t5 comparing i2 to vector length, VL. If the vector length test indicates that the loop did not complete, control flow returns to the beginning of block 1520. Otherwise, the loop completes and control flow ends, as per block 1525.

Figure 15B:
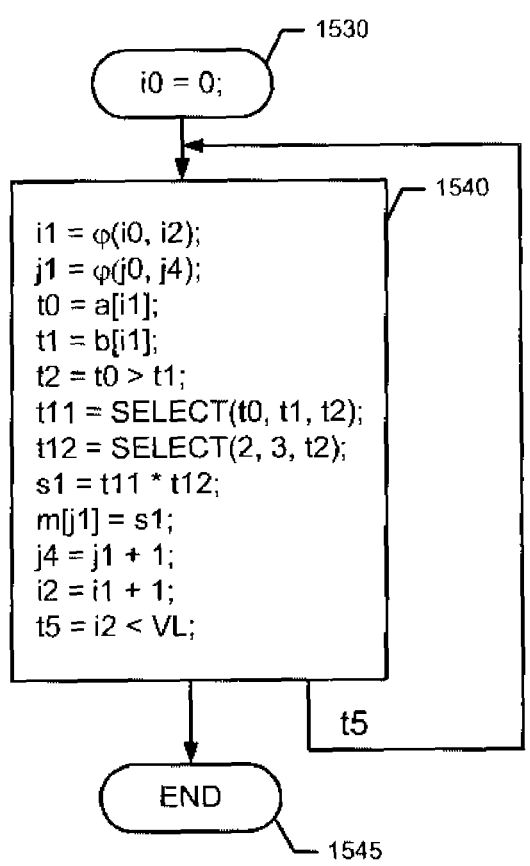
FIG. 15B shows a flowchart that depicts an exemplary output of a select promotion methodology.

FIG. 15B is a flowchart that depicts a select promotion optimization on the results of the method of FIG. 13 wherein the compiler promotes select operations ahead of other operations in a data flow graph. Moreover, the optimization shown in FIG. 15B illustrates the select promotion optimization of the operations resulting from the graph of FIG. 15A. Process flow commences with the initialization of i0=0, as per block 1530. The compiler executes or forces phi nodes for i1 and j1. Next, the compiler assigns a[i1] and b[i1] to t0 and t1, respectively. The compiler then assigns the test result of t0>t1 to t2 as shown. In this example, the compiler promotes t11 and t12 select operations forward in the code still within the basic block 1540. Next, the compiler assigns the resultant of t11*t12 to s1. The compiler also assigns s1, j1+1, and i1+1 to m[j1], j4, and i2, respectively. Finally, the compiler performs a test on vector length VL, as per t5. If the vector length test indicates that the loop did not complete, control flow returns back to the beginning of block 1540. Otherwise, the control flow completes and the operation ends, as per block 1545.

The flow diagrams in FIG. 15A and FIG. 15B do not consider all possible optimization combinations, because a compiler may interchange the operands of select operations with an appropriate inversion of the select condition. In one embodiment, the compiler maintains IR (intermediate representation) in canonical form, by ensuring that different code forms always map to a single representation form. The representation form further reduces the number of checks necessary in conjunction with optimization. The compiler may perform a number of additional known optimizations such as dead code elimination, common subexpression elimination, copy propagation and so forth that may provide benefits when the compiler applies these optimizations in combination with other optimizations taught herein.

FIG. 16 is a flow diagram that represents a methodology for select predicate combining, wherein the compiler combines multiple select operations into a single select operation. The compiler initializes a select predicate combining operation at start block 1610. The compiler identifies a select_stmt argument on which to perform the select predicate combining optimization operation, as per block 1620. The compiler performs a test with coded sequence setting_op(src1(select_stmt))==SELECT && src2(setting_stmt(src1(select_stmt))==src2(select_stmt)?, as per block 1630. More particularly, the compiler determines if a first select operation receives as input the output of a second select operation, and whether these select operations have common semantic types, as per block 1630. More specifically, the first select operation is a candidate for predicate combining, if the output of the second select operation has the same semantic type as the second operand of the first select operation, as per block 1630. If the compiler select operations test of block 1630 returns a true result, the compiler generates a variable p1, as per block 1635.

The compiler inserts a statement into the intermediate representation with the insert statement insert(assign(p1, and_op (src3(setting_stmt(src1(select_stmt))), src3(select_stmt)))); per block 1640. The compiler combines the select predicates (conditions) for the select statements that block 1620 selects, by combining predicates (conditions) of the first and second SELECT statements, as per block 1640. More particularly, the compiler selects the src1 input of a SELECT statement feeding the picked SELECT statement of block 1620 if the conditions of both the first and second select statement are TRUE, as per block 1640.

The compiler then inserts a statement into the intermediate representation by selecting from the first input of a SELECT statement feeding the picked SELECT statement of block 1620, and a second input of the picked SELECT statement of block 1620, as per block 1645. The second input of the picked SELECT statement of block 1620 is the same as the second input of the SELECT statement feeding the picked SELECT statement of test block 1630. The compiler generates insert statement insert(assign(dest(select_stmt), select_op(src1 (setting_stmt(src1(select_stmt))), src2(select_stmt),p1))); as per block 1645.

The compiler deletes the original select statement selection, selected per block 1620 and cleans up any dead computations, as per block 1650. The compiler performs a test to determine if more select operations are candidates for select predicate combining, as per block 1655. If the compiler test of block 1655 returns a true result, the compiler picks the next select_stmt on which to perform the select predicate combining optimization, as per block 1620. If the test of block 1655 for additional select operations returns a false result, the select predicate combining operation is complete and flow ends at end block 1660.

Returning to block 1630, if the compiler test with coded sequence setting_op(src1(select-stmt))==SELECT && src2 (setting_stmt(src1(select_stmt))==src2(select_stmt)?
returns a false result, the compiler then tests to determine if a select operation receives as its input the output of another select operation, as per block 1670. Moreover, the compiler test per block 1670 tests whether the select operations of block 1630 include common features, specifically whether the first input of the first SELECT operation is the same as the second input of the second SELECT operation, for predicate combining. The compiler test of block 1670 utilizes intermediate code setting_op(src1(select_stmt))==SELECT && src1(setting_stmt(src1(select_stmt))==src2(select_stmt)?.
The compiler test of block 1670 evaluates an inverse of select statements selected previously in block 1620. Moreover, the compiler test per block 1670 determines if the inverse select statements are candidates for the select predicate combining operation.

If the test for select predicate combining returns a false result, the compiler performs a test to determine if any additional predicate combining select operations exist, again per block 1655, and operational flow continues. If the compiler test of block 1670 for select predicate combining of select statement operations returns a true result, the compiler generates variable p1 as intermediate code, as per block 1675.

Next, the compiler inserts a statement into the intermediate representation with the insert statement insert(assign(p1,and_op(not_op(src3(setting_stmt(src1(select_stmt))), src3(select_stmt)))); as per block 1680. The compiler inserts the insert statement of block 1680, which combines the select predicates (conditions) of the first and second select operations, as per block 1680. More specifically, the select statements per block 1680 are fed by the second operand of the first select statement pick per block 1620 if the test per block 1630 is False, and the second operand of the second select statement pick per block 1620 if the test per block 1630 is True.

The compiler then inserts a statement into the intermediate representation selecting from the second input of the select operation feeding the select operation pick per block 1620, and the second input of the select operation pick of block 1620, as per block 1690. The compiler generates an insert statement insert(assign(dest(select_stmt), select_op(src1 (setting_stmt(src1 (select_stmt))), src2(select_stmt), src3(select_stmt)))); as per block 1620.

Next, the compiler deletes the original select statement selection, selected per block 1620 and cleans up any dead computations, as per block 1650. Operational flow continues until the select predicate combining operation is complete and flow ends at end block 1660.

In one embodiment of the disclosed select predicate combining optimization methodology, the compiler injects data parallel select instructions into an instruction stream to form a modified instruction stream. The compiler then identifies a first program sequence in the modified instruction stream wherein a first select operation feeds into a second select operation, and wherein an input value of the first select operation is the same as an input value of the second select operation, thus providing a shared input value. The compiler replaces the second select operation with a new select operation having an input value corresponding to all conditions under which the compiler may select the shared input value. The terms "predicate" and "input value" of a select operation are interchangeable.

The above description shows advantageous methods for generating optimized select operation-based code that is vectorizable with known vectorization methods in accordance with step 470 of FIG. 4. The disclosed methodology may improve the execution of vectorized code via the optimization techniques taught herein. In yet another optimized aspect of select operations, the compiler identifies code wherein select operations with strongly biased branches, those with a skewed distribution, or those with highly misbalanced then-else paths may be candidates for select optimization. Moreover, the compiler may eliminate processing of entire vectors and collapse code branches during a vector culling optimization operation.

Vector culling provides an advantageous optimization methodology when the distribution between then-else paths in a coded sequence exhibits heavy skewing or highly non-uniform branches. More particularly, when one then-else path is significantly shorter path than a second then-else path, vector culling provides a number of optimization benefits. Under a condition wherein then-else paths of a coded sequence exhibit heavy skewing, the compiler may perform a test to determine whether all vector slots that the code references require a shorter path or possibly an empty path. If the compiler test for shorter paths returns a true condition, the compiler executes a vectorized version of the more efficient shorter path. In highly dependent graphics operations wherein a set of vectors are outside the visible area, the vector culling operation may suppress a number of graphics pipeline transform steps to achieve effective compiler code optimization.

Figure 17:
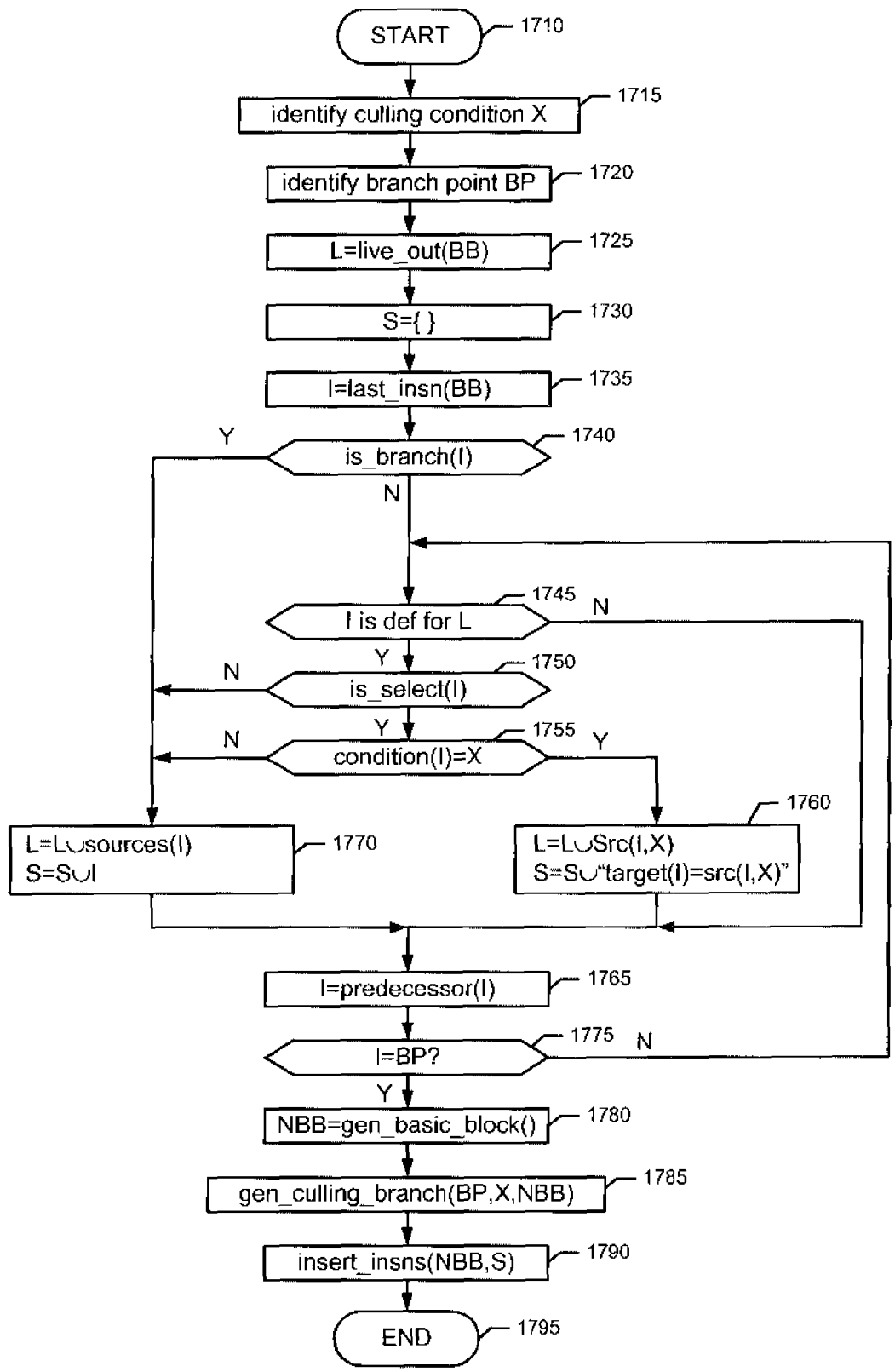
FIG. 17 shows a flowchart depicting a methodology for vector culling.

FIG. 17 is a flow diagram that represents a methodology for vector culling showing representative vector-based pseudocode including high level basic blocks. In the disclosed method, a compiler generates basic blocks with a reduction in execution flow when a culling condition holds true for all elements of a vector. In one embodiment, the method operates on an internal representation that the compiler optimizes to use with data parallel select operations.

The compiler initializes a vector culling operation on a basic block at start block 1710. The compiler then identifies a culling condition X, as per block 1715. The compiler identifies a branch point BP to provide efficient scheduling, as per block 1720. In one embodiment, the compiler performs an optimization operation by using static prediction to select a branch point BP, and to further allow the efficient use of static prediction by ensuring the availability of the input operands for the static prediction.

The compiler computes a live set of values at the exit of the current basic block BB, shown with pseudocode L=live_out (BB), as per block 1725. The compiler initializes S to the empty set with coded sequence S={ }, as per block 1730. The compiler optimization methodology uses coded sequence S to collect operations for injection into a simpler basic block. The collected operations exhibit the coded attributes of culling condition X. With pseudo code I=last_insn(BB), the compiler identifies the last operation of the basic block BB, as per block 1735. More particularly, the compiler assigns the last operation to the condition of I, and begins a backward sweep of the basic block BB.

The compiler then performs a test to determine if the operation condition of I represents a branch operation, as per block 1740. If the compiler test of block 1740 returns a false result, the compiler then performs a test to determine if the operation I defines one of the values in L, as per block 1745. If the compiler test of block 1745 returns a true result, the compiler then performs an additional test to determine whether operation i, defining a value in L, is a select operation shown with pseudocode of is_select(I), as per block 1750.

If the compiler test of block 1750 returns a true result, the compiler performs a new test to determine if the operation I exhibits a select condition corresponding to the culling condition X with coded sequence, condition(I)=X, as per block 1755. If the compiler test of block 1755 returns a true result, then the compiler identified a select operation that selects between an L input and an S input, as per block 1760. The compiler bases the L and S input selections on the culling condition X that block 1715 identifies. The compiler adds the input that culling condition X selects to the set of values L, via pseudocode L=L∪Src(I,X), as per block 1760. The compiler records an assignment of that input to the target of the select operation in the set S as shown by pseudocode S=S∪"target (I)=src(I,X)", as per block 1760. During compiler operation the input that culling condition X selects adds to the set of values L.

The compiler then identifies the predecessor of the operation I, as per block 1765. Returning to block 1740, if the compiler test of block 1740 returns a true result and if the operation condition of I describes a branch operation, then the compiler executes pseudocode of L=L∪sources(I) and S=S∪I, as per block 1770. Moreover the compiler adds the sources of operation I to the set of variable L, and adds the operation I to the set of instructions S, as per block 1770. Subsequently, returning to the select operation compiler test of block 1750, if the compiler test returns a false result then the compiler executes the pseudocode for L and S, as per block 1770. Returning to the condition compiler test of block 1755, if that compiler test returns a false result, the compiler again executes the pseudocode for L and S, as per block 1770. After the compiler executes the pseudocode for L and S, the compiler again identifies the predecessor of the operation condition of I, as per block 1765. Moreover, if the compiler test of block 1745 determines that the operation condition of I defines one of the values in L by returning a false result, the compiler identifies the predecessor of the operation condition of 1, again as per block 1765.

The compiler performs a test in block 1755 to determine if compiler operation reaches the branch point BP that block 1720 previously identifies or selects. The culling condition X identifies the branch point BP. If the compiler test of block 1775 returns a false result, the compiler continues the backward sweep operation with the next operation, as per block 1745. Subsequently, the compiler performs an additional test 1745 to determine if the operation condition of I defines one of the values in L, again as per block 1745. If the compiler test 1775 returns a true result, the compiler then generates a new basic block NBB, as per block 1780. Moreover, the compiler generates a representative code path with pseudocode NBB=gen_basic_block( ), per culling condition X, as per block 1780. The compiler then inserts a culling branch or culling branch sequence, at branch point BP based on the culling condition X, to new basic block NBB, as shown by representative pseudocode gen_culling_branch(BP,X,NBB), as per block 1785.

The compiler next inserts operations into new basic block NBB, as per block 1790. The compiler collects operations in set S, and respecting operational def-use dependencies and other such ordering constraints, generates new basic block NBB by inserting the operations from set S into the basic block NBB, as per block 1790. The compiler connects the output control flow edge(s) of new basic block NBB to correspond to an output control flow edge emanating from basic block BB.

The vector culling optimization operation of FIG. 17 terminates at end at block 1795. Culling branch at BP may connect directly to the output edge from original basic block BB if set S represents an empty set. To maintain the SSA form, the compiler insertion operation of block 1790 generates a new set of temporary values. Moreover, the compiler operation of block 1790 inserts phi-node edges at the control flow merge point from basic block BB and new basic block NBB.

Figure 18:
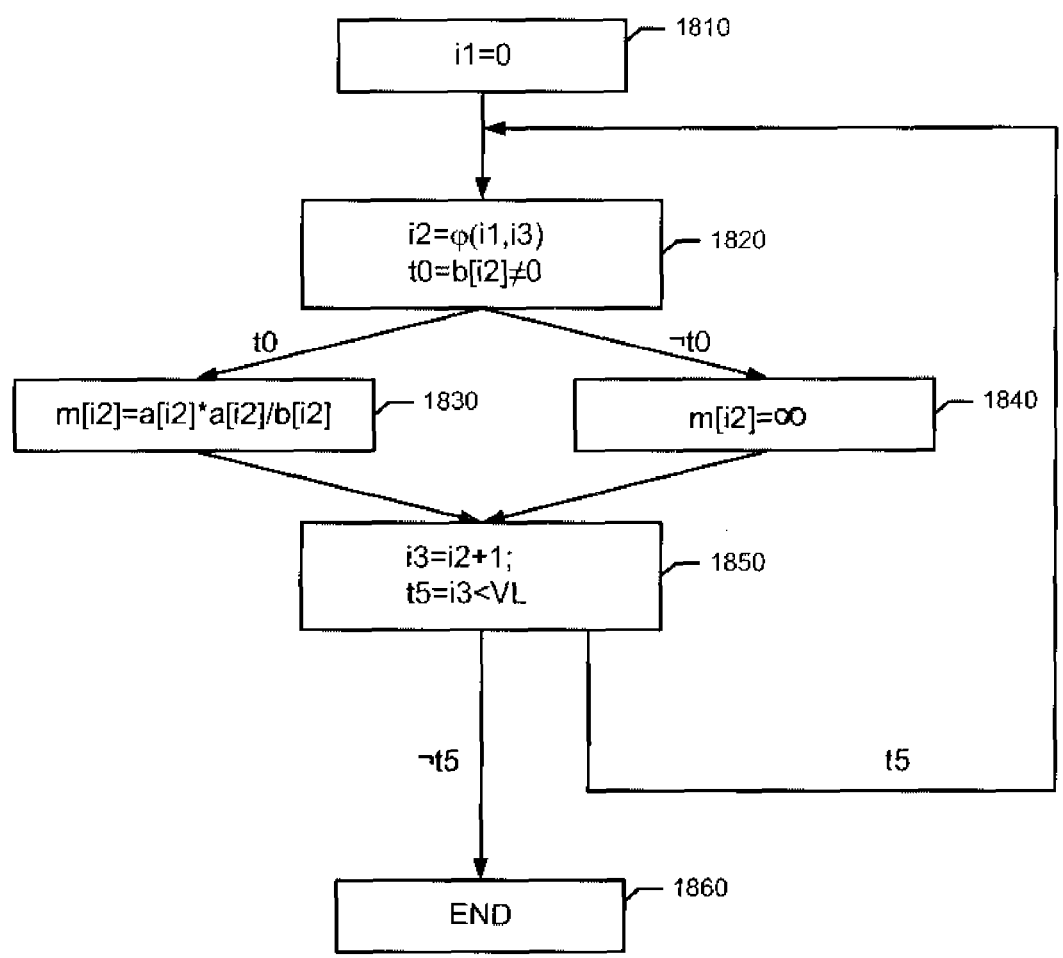
FIG. 18 shows a flowchart of a sample program used to show the operation of the vector culling methodology of FIG. 17.

FIG. 18 shows an exemplary input flow graph to further demonstrate the operation of the vector culling method of FIG. 17. The exemplary code starts with coded sequence i1=0, as per block 1810. The code then exhibits a phi-node i2=ϕ(i1,i3) and computes condition t0=b[i2]≠0, as per block 1820. In accordance with one condition path for conditional path to, the compiler evaluates the complex coded equation for m[i2] of m[i2]=a[i2]*a[i2]/b[i2], as per block 1830. In accordance with another condition for conditional path ¬t0, the compiler assigns the default value for m[i2] of m[i2]=∞, as per block 1840.

Both the coded equation path of block 1830 and the default assignment paths of block 1840 merge to loop terminating conditions represented as i3=i2+1, and t5=i3<VL, as per block 1850. If condition t5, per block 1850 is true, the compiler returns to the conditional test computation of block 1820 and the vector culling loop continues. If the condition t5 in block 1850 is false as indicated by ¬t5, the vector culling operation is complete, as per block 1860. The coded example of FIG. 18 thus describes one embodiment of the disclosed vector culling methodology of FIG. 17.

In one embodiment of the disclosed vector culling methodology, the compiler injects data parallel select instructions into an instruction stream to form a modified instruction stream. The compiler identifies a conditional operation in the modified instruction stream upon which to perform a vector culling optimization. The compiler computes a culling condition on vector elements in the modified instruction stream.

The compiler then generates a branch in the modified instruction stream to an alternate basic block containing code corresponding to a vectorized path in which all elements correspond to the culling condition. In one embodiment, the compiler generates the alternate basic block containing a vectorized computation wherein all elements correspond to the culling condition.

FIG. 19A is a flowchart that illustrates the vectorized loop of the methodology described per FIG. 18. Basic block BB represents one coded basic block embodiment that the compiler generates using an above described select optimizations, as per block 1910. Select optimizations include select promotion, select sinking, select fusion, select unification, and a select predicate combining procedure with respect to data parallel select operations. The compiler optimization operations may optionally include conditional store conversion, conditional mask expansion, a basic block-level select generation optimization procedure, dead code elimination, a phi-node conversion procedure and hyperblocking. Moreover, the compiler may use additional optimization operations not shown in this embodiment.

Basic block BB of FIG. 19A represents one basic block of a data control flow diagram. In more detail, basic block BB represents an internal representation that the compiler generates from the control flow graph of FIG. 18. The basic block is a node in a larger control flow diagram as indicated by arrows into and out of block 1910. The compiler generates the coded sequence i=4, t0=vcmpeq(bv,v_zero), t1=vmulfp(av,av), t2=vdivfp(t1,bv), and m=vsel(t2,vinf,t0). This coded sequence represents one compiler coded optimization result. Multiple such compiler coded sequences are a result of the compiler optimization methodologies of this embodiment.

FIG. 19B is a flowchart that represents a control flow graph of the vectorized coded example of FIG. 19A. FIG. 19B also represents the results of the vector culling methodology of FIG. 17. The compiler inserts the vector culling vectorized code into basic block BB of FIG. 19B after the control flow input arrow, as per block 1920. The compiler inserts a coded operational sequence into basic block BB to perform a branch on all conditional elements of t0. The compiler generates pseudocoded sequences i=4, t0=vcmpeq(bv,v_zero), t4=vshufb(t0,t0,0x004488cc), beq t4,BB', t1=vmulfp(av,av), t2=vdivfp(t1,bv), and m=vsel(t2,vinf,t0) for basic block BB, as per block 1920. When a vector slot meets the culling condition, control passes from the beginning conditional branch instruction, that analyzes the culling condition, to basic block BB'. If all vector slots meet the culling condition, the compiler performs a vectorized assignment, as per block 1930. The compiler assigns the code in a new basic block BB' if all vector slots meet the culling condition, again as per block 1930. The compiler code sequence m=v_inf corresponds to the vectorized assignment of the default expression m[i2]=∞ of block 1840 in FIG. 18.

The control flow of the two basic blocks of control flow graph of FIG. 19B merge with the target output of basic block BB and target output of new basic block BB'. Moreover, the new basic block BB' corresponds to the new basic block NBB coded sequence of FIG. 17.

Those skilled in the art will appreciate that the methodologies disclosed, such as the disclosed code conversion and optimization methodologies, may be implemented in hardware or software. Those skilled in the art will also understand that the optimizations disclosed may also be practiced under additional constraints limiting the amount of parallelization, such as the need to consider when one or more instructions can raise data dependent exceptions, or limits on arithmetic transformations that programming language standards impose. Those skilled in the art will further understand that the methods shown herein are exemplary, i.e., by showing in several scenarios the processing in the presence of operations with two operands, and are extendable and adaptable to specific architectures, i.e., by supporting operations having a single operand, or having more than two operands. Moreover, the methodologies that the flowcharts of FIGS. 3-19 represent may be embodied in a computer program product, such as a media disk, media drive or other storage media.

In one embodiment, the disclosed methodology is implemented as a application, namely a set of instructions (program code) in a code module which may, for example, be resident in the system memory 142 of IHS 100 of FIG. 1. Until required by processor 105, the set of instructions may be stored in another memory, for example, non-volatile storage 162 such as a media drive, or in a removable memory such as an optical disk or floppy disk, or downloaded via the Internet or other computer network. Thus, the disclosed methodology may be implemented in a computer program product for use in a computer such as IHS 100. It is noted that in such a software embodiment, code which carries out the functions described in the flowcharts of FIG. 3-19 may be stored in RAM or system memory 142 while such code is being executed. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Moreover the functions described in the flowcharts of FIG. 3-19 can similarly be resident as a code module in a system memory 142 of a user system or IHS 100. Alternatively such a code module may be embodied in a computer program product, such as a media disk, media drive or other storage media.

The foregoing discloses an information handling system that employs a compiler methodology to convert or optimize code with respect to data parallel select operations. In one embodiment, the disclosed method includes generating data parallel select operations for use in a SIMD environment to replace conventional test and branch statements. The method may provide optimization processes to improve both code length efficiency and data flow graph efficiency. The method may also include a select promotion optimization methodology wherein a compiler promotes select operations ahead of other operations in a dataflow graph. The method may further include a select sinking process that re-orders select operations that execute after other operations in a data flow graph. The method may still further include a select fusion process wherein the compiler combines multiple select operations into a single select statement for efficiency purposes. The method may also include a select unification process wherein the compiler combines selecting between two instances of the same term into a single non-selected term. The method may further include a predicate combining process that combines multiple select operations into single select operations. The disclosed method may still further include a conditional store process, wherein the compiler converts conditionally executed stores (under the control of a guarding control statement) into vectorizable sequences of select and store operations. The method may also include a conditional mask expansion process wherein the compiler takes a single Boolean condition and expands it to a mask including either 0s or 1s in the appropriate slot. The method may also include a basic block-level select generation process to increase processing efficiency. The method also may include a hyper-blocking process code to optimized code from a broader compiler viewpoint. The method may still further include phi-node conversion for picking a valid value of a previously used variable. In one embodiment, the select promotion, select sinking, select fusion, select unification and select predicate combining optimization methodologies operate on data parallel select operations, whereas the hyperblocking, phi-node conversion, conditional store conversion, conditional mask expansion, basic block-level select generation and vector culling optimization methodologies operate on code as a whole including both data parallel select and non-data parallel selection operations.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. An information handling system (IHS) comprising:
a processor capable of processing program code that includes data parallel select processing operations; and
a memory coupled to the processor, the memory including a compiler, wherein the compiler:
receives an instruction stream including a plurality of instructions that form the program code, the instructions being related to both scalar and vector data;
forms hyperblocks from the instruction stream thus providing an instruction stream with hyperblocks;
injects data parallel select instructions into the instruction stream with hyperblocks to form a modified instruction stream wherein conditional test and branch instructions are replaced with data parallel select instructions;
revises the modified instruction stream to enhance execution of the data parallel select instructions by performing select promotion operations on the modified instruction stream, wherein the select promotion operations:
identify a program sequence in the modified instruction stream wherein a select operation is associated with two selection sources corresponding to two operations of the same type, the two selection sources including input operands, the select operation yielding a result computation; and
replace the result computation of the select operation with at least one other select operation corresponding to a selection of at least one of the input operands, the output of the at least one other select operation feeding another operation of the same type, thus providing a revised modified instruction stream; and
generates vectorized code from the revised modified instruction stream.

2. The IHS of claim 1, wherein the compiler revises the modified instruction stream by performing select unification operations on the modified instruction stream, wherein the select unification operations:
identify a select operation in a program sequence in the modified instruction stream, the select operation including first and second input values, wherein the first and second input values corresponding to selection in the case of a true predicate are the same as the first and second input values corresponding to the case of a false predicate, and
replace the select operation with an assignment of one of the first and second input values.

3. The IHS of claim 1, wherein the compiler revises the modified instruction stream by performing select predicate combining operations on the modified instruction stream, wherein the select predicate combining operations:
 identify a first program sequence in the modified instruction stream wherein a first select operation feeds into a second select operation, and wherein an input value of the first select operation is the same as an input value of the second select operation, thus providing a shared input value; and
 replace the second select operation with a new select operation having an input value corresponding to all conditions under which the shared input value can be selected.

4. The IHS of claim 1, wherein the compiler revises the modified instruction stream by performing conditional store conversion operations on the modified instruction stream, wherein the injection of data parallel select operations in the instruction stream:
 identifies in the modified instruction stream a store operation that corresponds to one conditional path in a hyperblock in the modified instruction stream, thus providing an identified store operation; and
 replaces the identified store operation with a program sequence including a select operation that selects a stored data value based on a condition of the conditional path and the identified store operation.

5. The IHS of claim 1, wherein the compiler revises the modified instruction stream by performing conditional mask expansion operations on the modified instruction stream, wherein the injection of data parallel select operations in the instruction stream:
 identifies in the instruction stream an assignment to a field of a value which corresponds to a wide data word;
 aligns the value to a position corresponding to a position in the wide data word for updating purposes;
 generates a select mask for a data parallel select operation wherein the select mask selects a first operand corresponding to non-assigned fields in the wide data word and a second operand corresponding to assigned fields in the wide data word; and
 generates a select operation that selects from the wide data word and the aligned value under control of the select mask.

6. The IHS of claim 1, wherein the compiler revises the modified instruction stream by vector culling that:
 identifies a conditional operation in the modified instruction stream upon which to perform a vector culling optimization;
 computes a culling condition on vector elements in the modified instruction stream;
 generates a branch in the modified instruction stream to an alternate basic block containing code corresponding to a vectorized path in which all elements correspond to the culling condition; and
 generates the alternate basic block containing a vectorized computation wherein all elements correspond to the culling condition.

7. An information handling system (IHS) comprising:
a processor capable of processing program code that includes data parallel select processing operations; and
a memory coupled to the processor, the memory including a compiler, wherein the compiler:
 receives an instruction stream including a plurality of instructions that form the program code, the instructions being related to both scalar and vector data;
 forms hyperblocks from the instruction stream thus providing an instruction stream with hyperblocks;
 injects data parallel select instructions into the instruction stream with hyperblocks to form a modified instruction stream wherein conditional test and branch instructions are replaced with data parallel select instructions;
 revises the modified instruction stream to enhance execution of the data parallel select instructions by performing select sinking operations on the modified instruction stream, wherein the select sinking operations:
  identify a first program sequence in the modified instruction stream wherein at least one select operation of the first program sequence selects from two values that feed another operation exhibiting a type, the another operation yielding a result computation; and
  replace the result computation of the another operation with a second program sequence in which a select operation selects from two computed values, each of the two computed values corresponding to an operation of the type of the another operation, thus providing a revised modified instruction stream; and
 generates vectorized code from the revised modified instruction stream.

8. An information handling system (IHS) comprising:
a processor capable of processing program code that includes data parallel select processing operations; and
a memory coupled to the processor, the memory including a compiler, wherein the compiler:
 receives an instruction stream including a plurality of instructions that form the program code, the instructions being related to both scalar and vector data;
 forms hyperblocks from the instruction stream thus providing an instruction stream with hyperblocks;
 injects data parallel select instructions into the instruction stream with hyperblocks to form a modified instruction stream wherein conditional test and branch instructions are replaced with data parallel select instructions;
 revises the modified instruction stream to enhance execution of the data parallel select instructions by performing select fusion operations on the modified instruction stream, wherein the select fusion operations:
  identify a program sequence in the modified instruction stream wherein a first select operation provides an input value into a second select operation, wherein predicates of the first and second select operations select a subset of input operands of the first select and second select operation input values; and
  replace the second select operation with a select operation that selects from the subset, thus providing a revised modified instruction stream; and
 generates vectorized code from the revised modified instruction stream.

* * * * *